INVENTORS
Charles E. Winters
Clifton B. Graham
Joseph S. Culver &
Robert H. Wilson
BY
ATTORNEY July 19, 1960
C. E. WINTERS ET AL
2,945,794
NEUTRONIC REACTOR OPERATIONAL METHOD AND CORE SYSTEM
Filed Nov. 18, 1952
4 Sheets-Sheet 3
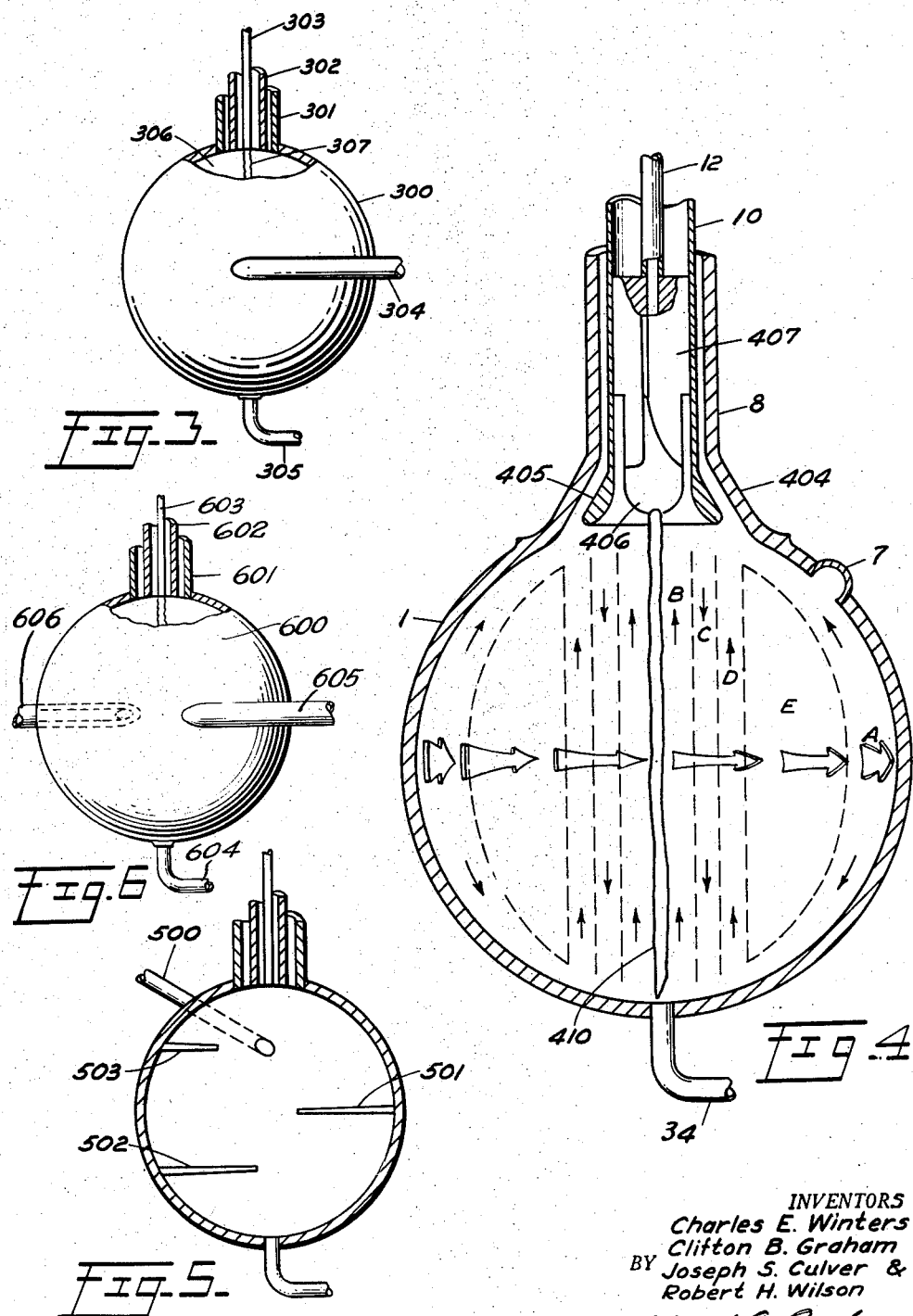
INVENTORS
Charles E. Winters
Clifton B. Graham
BY Joseph S. Culver &
Robert H. Wilson
ATTORNEY July 19, 1960
C. E. WINTERS ET AL
2,945,794
NEUTRONIC REACTOR OPERATIONAL METHOD AND CORE SYSTEM
Filed Nov. 18, 1952
4 Sheets-Sheet 4
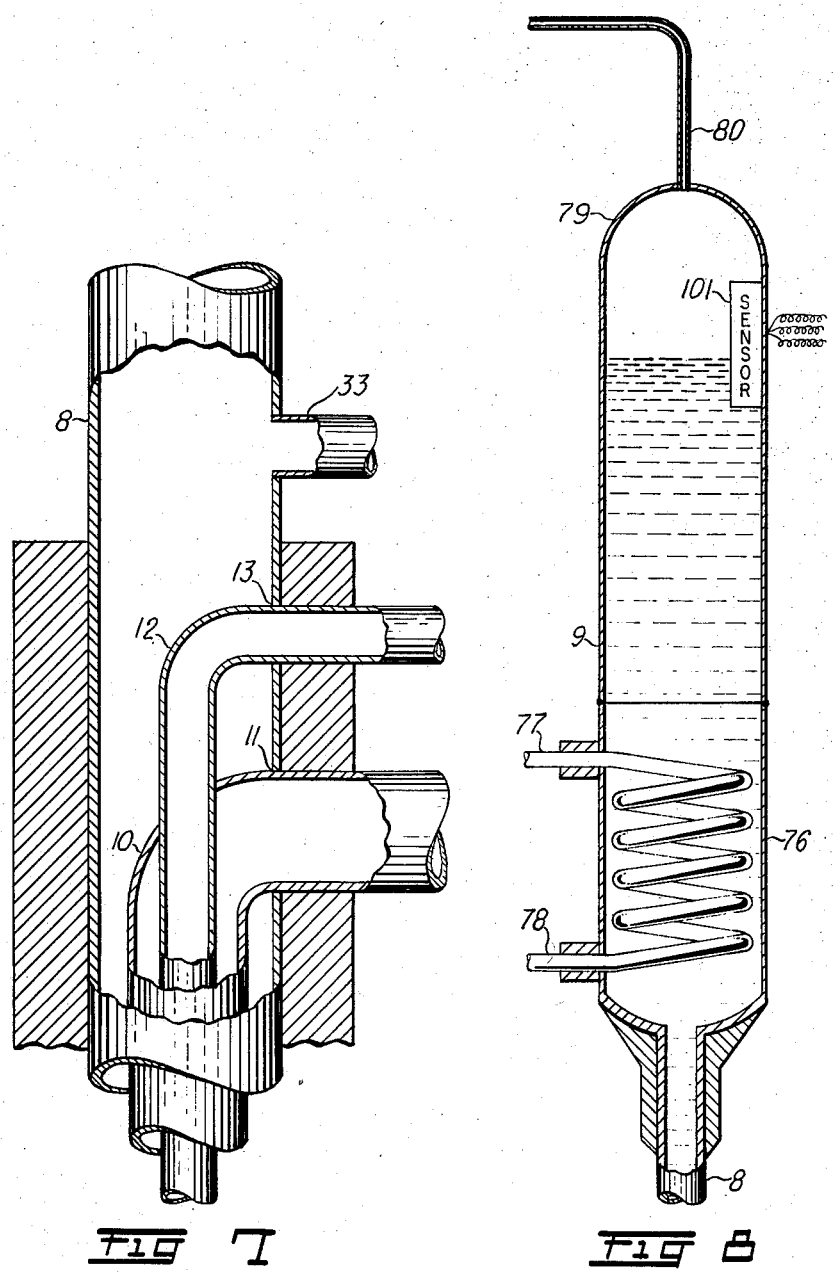
INVENTORS
Charles E. Winters
BY Clifton B. Graham
Joseph S. Culver &
Robert H. Wilson

2,945,794

NEUTRONIC REACTOR OPERATIONAL METHOD AND CORE SYSTEM

Charles E. Winters, Clifton B. Graham, Joseph S. Culver, and Robert H. Wilson, Oak Ridge, Tenn., assignors to the United States of America as represented by the United States Atomic Energy Commission Filed Nov. 18, 1952, Ser. No. 321,078

33 Claims. (Cl. 204—154.2)

The present invention relates in general to neutronic reactors, and more particularly to an improved method for operating a neutronic reactor employing fissionable fuel in liquid form, and to a novel core system adapted to implement such method, for mitigating and obviating serious difficulties which otherwise attend radiation-induced gas evolution within the cores of such reactors.

As is known, certain particular isotopes, termed fissionable materials—prominent among which are uranium 235, plutonium 239, uranium 233, and others, and all of which, by definition, are capable of undergoing fission upon capture of a slow neutron—upon being subjected to neutron bombardment, absorb neutrons of indiscriminate energies and thereupon undergo fission. In fission, the atomic nucleus of the fissionable isotope, upon the absorption of a neutron, splits into a plurality of fragments of greater mass than an alpha particle, which splitting is accompanied by the release of a relatively enormous amount of energy and a plurality of neutrons. By virtue of the fission reaction's generating more new neutrons than it consumes, it is possible, by amassing sufficient fissionable material under appropriate conditions, to form an aggregate system capable of generating neutrons at a rate equal to or greater than that at which they are being lost to the system as the result of absorption in the system or leakage from the system, and consequently capable of maintaining a self-sustaining neutron-induced chain fission reaction. Such an amassment constitutes the essence of a neutronic reactor, and may be termed the "core" of a neutronic reactor; the mass of fissionable material sufficient to generate neutrons at a rate equal to, or greater than, loss is referred to as a "critical mass," or a "supercritical mass," respectively.

While the neutrons generated in the fission reaction are generally of quite high kinetic energy, it happens that the propensity of fissionable isotopes for absorption of neutrons leading to fission prominently increases with decrease in the kinetic energy of the neutrons, with generally the greatest susceptibility to such absorption obtaining in the instance of neutrons which are so slow as to be in substantial thermal equilibrium with the system (e.g., neutron kinetic energy of ca. 0.025 electron volt at 15° C.). Accordingly, it has become customary practice in most circumstances to incorporate in the amassment a substantial proportion of a material effective in markedly reducing the kinetic energy of neutrons upon their encountering the same, without contemporaneously absorbing neutrons to any excessive degree. Such a material is termed a "neutron-moderant," and may be more precisely defined as a non-gaseous material for which the ratio $$\frac{\xi \sigma_s}{\sigma_a}$$

is greater than 10, wherein $\xi$ is the average loss in logarithm of the energy of a fast neutron per elastic collision with the material, $\sigma_s$ is the slow neutron elastic scattering cross-section per atom of the material, and $\sigma_a$ is the slow neutron capture cross-section per atom of the material. Through serving to decelerate the neutrons to much more effective energy levels, such incorporated neutron-moderant will beneficially afford sizeable reduction in the amount of fissionable material necessary to constitute a critical mass.

Toward further reducing the amount of fissionable material required, and toward otherwise promoting increased reaction efficiency by conserving neutrons, it is also customary in many instances to encase the chain-reacting amassment in a jacket of a material effective in reflecting otherwise-escaping neutrons back into the amassment. For reactor cores where neutrons of energy approximating thermal equilibrium preponderate, neutron-moderant materials are usually satisfactory for constituting such a neutron reflector.

Among the various practical uses of the neutronic reactor, particularly prominent is its application as a radically-advanced source of thermal power. Significantly, in fission, the specific energy content liberatable by nuclear reaction is enormous; the quantity and rate of thermal energy producible, per unit amount of fissionable material consumed, vastly surpass those producible by conventional chemical combustion. For example, in neutron-induced fission of the 235 isotope of uranium, the amount of thermal energy produced per pound of fuel consumed is of the order of 2,000,000 times that produced by aviation gasoline. Consequently, even in brisk operation as a heat source, a reactor's fuel depletion is comparatively insignificant, such that the initial charge of fuel is ordinarily sufficient to sustain the reaction indefinitely; with such a "furnace," the need for constantly replenishing the fuel is virtually eliminated. Similarly, since the chain fission reaction is inherently capable of operation at intensities on up to those orders manifested by the stellar temperatures attained in atomic bombs, the reactor as a heat source is normally adapted to operation at virtually any desired rate of energy release and temperature level that its structure and materials of construction can withstand. Furthermore, a chain fission reacting system admits of unusual compactness; especially when gross amounts of extraneous materials are excluded from the amassment, an operating reactor core may well be smaller than a few cubic feet in volume. By virtue of these attributes, the nuclear reactor has proven exceptionally promising for use as the ultimate heat source for power plants, particularly for stationary electric generating plants, and for mobile, propulsive power plants for ships and aircraft; of especial significance in mobile applications, where the afforded elimination of the need for any substantial amount of replacement fuel renders insignificant the formerly-limiting fuel capacity consideration, practically limitless range of such craft may be realized.

In the development and design of reactors for such purpose, interest and effort has been directed largely along the lines of an amassment of both fissionable material and neutron moderant in solid form, through which a fluid heat-transfer medium would be passed to extract the heat generated. Typical of this mode of construction, the reactor core would comprise a matrix of clustered blocks of a neutron moderant in ceramic or metal form, having disposed in hollows therein a multiplicity of masses of fissionable fuel also in ceramic or metal form, through which, via a system of ducts, is passed a heat-transfer liquid or gas to practically recover the heat produced. While fully affording the aforementioned extraordinary advantages in thermal power production, such solid-core reactors have not proven unqualifiedly satisfactory for the purpose. Common among the difficulties encountered in them is the need for continual presence of a considerable quantity of heat-transfer medium, extraneous to the neutronic reaction, within the core; ordinarily, the medium not only occupies considerable space, thus adding to the necessary volume of the core, but also fruitlessly absorbs sizeable proportions of the neutrons generated—on both counts, disadvantageously necessitating considerable increase in the amount of fissionable material required to constitute a critical mass in such core. Too, being constituted of an agregation of solid elements, such core, especially in mobile applications subject to tilting and jarring, needs considerable internal support structure—again of extraneous materials, similarly occupying valuable space and fruitlessly absorbing neutrons. Furthermore, to provide sufficient thermal force to drive the great amounts of heat generated per unit volume of core into the heat-transfer medium, it would be necessary to maintain the solid portions of the core at temperatures as much as several hundred degrees above the maximum attained in the heat-transfer stream; as a result, at such higher temperatures, series taxing of the thermal stability of the solid core elements would result, attended by warpage, breakage, and other mechanical failures, although all the while the heat was being delivered outside the core by the heat transfer medium at a temperature unprofitably several hundred degrees lower than that at which the core operates. Another prominent difficulty regularly encountered with solid-cored reactors arises in connection with a customary periodic decontamination of the fissionable fuel. Since a number of the fission products—i.e., the fragments formed upon fission and their radioactive decay products, comprising isotopes within the range of atomic numbers of 30 to 63—are voracious absorbers of neutrons, continued self-sustenance of the neutronic reaction requires that fission product accumulation be kept at a very low level; in practice, each unit of fissionable material upon becoming sufficiently contaminated is removed, to be processed for elimination of the fission product contamination and isolation of the purified bulk of fissionable material for reuse in the reactor. Disadvantageously, for a solid-cored reactor, this normally involves either a periodic, complete shut down and major dismantling of the reactor, or an undesirably ponderous and complex mechanism associated with the core for replacement and withdrawal of individual fissionable fuel elements as becomes necessary while maintaining continued operation of the reactor.

For further information and details as to the theory, construction, and operation of neutronic reactors generally, and solid-core reactors in particular, reference may be made to the following sources:

"The Science and Engineering of Nuclear Power," edited by Clark Goodman, vol. 1 (1947), and vol. 2 (1949), Addison-Wesley;

"First Detailed Description of the AEC Research Reactors," in Atomics, vol. 6, November-December 1950; and co-pending applications of the common assignee:

S.N. 578,278, filed February 16, 1945, in the names of Enrico Fermi and Miles C. Leverett, for A Chain Reacting System, now Patent No. 2,837,477, issued June 3, 1958;

S.N. 596,465, filed May 29, 1945, in the names of Enrico Fermi and Leo Szilard for Air-Cooled Neutronic Reactor, now Patent No. 2,836,554, issued May 27, 1958;

S.N. 194,331, filed November 6, 1950, in the name of George A. Anderson, for Neutronic Reactor, now Patent No. 2,780,596, issued February 5, 1957;

S.N. 206,592, filed January 18, 1951, in the name of George A. Anderson, for Fuel Element Loading Apparatus for Neutronic Reactors, now Patent No. 2,794,562.

Toward circumventing some or all of these shortcomings of the solid-core system, resort to liquid form for both the fissionable fuel and moderant has long been particularly appealing. Since both normal water and deuterium oxide (heavy water) are recognized to be superior moderants, aqueous solutions of uranium or plutonium, particularly uranium or plutonium highly enriched in one of its fissionable isotopes, have attracted special interest. Beneficially, with both fissionable fuel and moderant in a single liquid solution: there need no longer be any solid in the core to warp or crack; in place of complex internal support structure, a simple tank to contain the liquids is all that is necessary; and removal and replacement of portions of the fuel for decontamination, when necessary, is simply effected by draining and pumping of liquids. Further benefits derive upon circulating the liquid fuel-moderant, in substantially subcritical distribution, through an external circuit for recovering its generated heat; then, the need for an extraneous coolant within the core is advantageously eliminated, and the produced heat may be recovered at almost the same high temperature at which it was generated within the core. Moreover, by continuously or periodically routing a portion of the liquid fuel stream, in its passage external the core, through decontamination processing, even greater simplicity and convenience is achieved.

Prior to the present invention, a number of small-scale experimental reactors, employing an aqueous solution of a sulfate or nitrate of uranium or plutonium highly enriched in one of its fissionable isotopes as their fuel-moderant, and adapted to operation at merely quite low power densities, were successfully built and operated. In these reactors, the aqueous solution was either disposed in, or circulated through, a tank encased in a neutron reflector constituted of beryllium oxide and/or graphite; further details are available in co-pending applications of the common assignee:

S.N. 623,363, filed October 19, 1945, in the name of Robert F. Christy, for Reactor, now Patent No. 2,843,543, issued July 15, 1958;

S.N. 751,734, filed June 2, 1947, in the names of H. C. Urey, K. Cohen, and F. T. Barr, for Improved Method and Apparatus for Producing Energy by Nuclear Fission; and in the following publication "First Detailed Descripton of AEC Research Reactors" (supra).

However, although operation at very low power levels was found satisfactory, nevertheless at higher operational power levels the aqueous solution form of reactor core proved to be seriously plagued by an inherent characteristic which, prior to the present invention, was regarded to largely preclude practical application to large-scale power production. That is, as an adjunct to the fission reaction, the water of the aqueous solution in the core is progressively decomposed into principally hydrogen and oxygen gases—as well as a small amount of hydrogen peroxide—as a result of the intense ionization produced by the radioactive emanations and fission fragments emitted upon each fission. The magnitude of the resultant gas evolution is by no means insignificant; in operation at a power generation rate of 1000 kilowatts and at atmospheric pressure so much as several liters per second of gas would be evolved. Gas formation and bubbling of such magnitude directly within the critical amassment greatly detracts from general controllability of the reaction; the gas bubbles would tend to displace much of the fuel solution from the core tank toward rendering the amassment subcritical and inoperative, and if a core tank sufficiently larger to accommodate a critical amassment of fuel solution despite the bubbling were substituted, the resulting system would be susceptible, upon any momentary subsidence in the bubbling, to exceeding the bounds of all reasonable control means so as to run away in a perhaps catastrophic, uncontrolled neutronic fission reaction—uncondonably, a violent and erratic careening of the reaction between inoperative subcriticality and calamitous excessive supercriticality. As an added hazard, the evolved gas is, in itself, explosible, and thus endangers the entire reactor and its gas discharge system.

Considerable progress, though, has already been made toward overcoming this grim obstacle. Maintaining the chain-reacting solution under high pressure has been found not only to compress the evolved gas volume, thereby lessening the magnitude and violence of the displacement of fuel solution in the core, but also to promote a modest extent of recombination of the gases back into water. Likewise, various catalytic and combustion techniques for effecting controlled recombination of the gases, toward reducing the explosion hazard, have been devised and developed. Nevertheless, although the severity of the action can thereby be subdued, substantial bubbling has still persisted, in a nature still fundamentally unsatisfactory to effective control of the fission reaction at high power densities and consequently still repugnant to the desired application to power production. Particularly objectionable, the generated gas bubbles take random and erratic paths in their gradual rise to the surface of the liquid, which results in local non-uniformity and non-symmetry in distribution of fissionable material, with concomitant like local unbalance in the distribution of the rate of fission reaction. This effect becomes especially serious in view of the lingering rate of ascent of the bubbles, which represents a protracted residence time for each bubble in the solution. The aggregate effect is deleterious oscillation in the rate of reaction throughout the core, and, as a result, large and rapid fluctuations in the overall rate of fissioning. Furthermore, in rising, the liquid-displacing bubbles progressively gain the company of other bubbles at each higher level, and thus increase in number toward the top; this results in a non-symmetrical overall distribution of fissionable fuel, with the degree of non-symmetry varying with the overall rate of reaction—a condition which further contributes to oscillation and fluctuations in reactivity. Consequently, there has been an increasing desire that new, effective reactor means be found for finally overcoming the frustration of this gas-evolution difficulty, and affording practical and effective application of reactors employing fuel in aqueous liquid form, at appropriately high specific heat generation rates, to practical power production.

Accordingly, one object of the present invention is to provide a new and improved method for operating a neutronic reactor employing fissionable fuel and moderant in liquid form, which largely avoids and overcomes serious difficulties which would otherwise attend radiation-induced gas evolution ordinarily occurring within the core of such reactors.

Another object is to provide a new and improved core system for such a reactor particularly adapted to implement such method.

A further object is to provide such a method and core system especially suited to afford such improvement where the fissionable fuel and moderant are in aqueous solution form.

Still another object is to provide such a method and core system especially adapted to continuous circulation of the fuel-moderant liquid through the core, and through an external circuit for heat removal.

Still a further object is to provide such a method and core system which possess high inherent resistance to the chance of any hapless runaway, uncontrolled chain fission reaction.

Yet another object is, by providing such a method and core system, to afford an improved neutronic reactor, of such type, of appropriate fitness and suitability for practical-scale power production.

Yet a further object is to provide such a reactor suitable for economic and convenient fabrication, in a large measure, from conventional steam-plant, and chemical-processing vessels, apparatus, and plumbing, available in standard stock on the market.

Additional objects will become apparent hereinafter.

In accordance with the present invention, for improved operation of a neutronic reactor comprising a liquid containing fissionable material adapted to be maintained in an amassment and while so amassed, to engage in self-sustaining chain fission reaction with concomitant substantial gas evolution, a fundamentally-advanced method comprises maintaining said liquid in said amassment in rotational flow about a principal axis of the amassment at a sufficient velocity to provide a vortex, and discharging evolved gas as it concentrates within the cavity of the vortex. In establishing such a vortex, the fissionable-fuel-containing liquid in the amassment, upon being maintained in rapid axial rotation, is thrust outward toward the periphery of rotation by the resulting centrifugal force, and accordingly tends to vacate and form a cavity along the axis of rotation; thereupon, evolved gases, by virtue of their low density, are centripetally displaced toward the axis and into such cavity, from where the gases may be discharged as they concentrate. Importantly, upon such vigorous rotation, supergravitational fields many times that of normal gravity are centrifugally established. Under the correspondingly intensified influence toward centripetal bubble displacement concomitant to such fields of force, the bubbles of evolved gas, instead of lingeringly and wanderingly rising through the liquid, are caused to dart swiftly to the cavity; as a result, the comparable amount of gas dispersed in the liquid at any one time is markedly decreased, and erratic and fluctuating non-uniformity in fissionable material distribution is effectually minimized. To the same end, for a given general amassment, the distance through the liquid body each bubble must traverse is only a fraction of that in a quiescent tank, thus serving to further reduce the residence time of the bubbles in the liquid. Moreover, since all bubble migration is toward the central axis, overall non-symmetry of fissionable material distribution through the amassment is eliminated, thereby doing away with the associated conditions favorable to initiating and sustaining oscillatory fluctuations in fission rate throughout the amassment. Despite the erratic nature of vortices, especially when viewed in connection with the precise dependence of reactor criticality upon the constancy of volume and spatial disposition of the solution amassed, applicants have discovered and comprehensively demonstrated that such a dynamically balanced reactor system is regularly capable of performance amply steady for secure and reliable service, even in high-power-density applications.

In further accordance with the present invention, as an improved reactor core system particularly advantageous for implementing this method, for application in a neutronic reactor comprising a liquid containing fissionable material adapted to continuously flow as a stream through a container means and to engage in self-sustaining chain fission reaction with concomitant substantial gas evolution while within said container means, an improved container means comprises an internally-unobstructed closed container having an internal geometry of revolution about a principal axis; liquid-inlet duct means communicating substantially tangentially with the interior of said container; means defining a gas outlet substantially axially concentric with, and at an axial extremity of, said container; and means defining an annular liquid-outlet port substantially axially concentric with, and at the same axial extremity of, said container as, and surrounding, said means defining a gas-outlet port. Advantageously, with such a core system the rotation establishing the vortex is provided without the need for any neutron-absorptive mechanical impeller means within the core; furthermore, from a hydrodynamic standpoint, the actions of both the tangential introduction and the axial discharge of the liquid each complementarily contribute to maintaining the vortex in motion. Beneficially, the axial gas-outlet port will register naturally with an extremity of the cavity of the vortex, thereby affording discharge of evolved gas as it concentrates within the cavity; with all opportunity for progressive accumulation and sudden dislodgement of gas being thereby entirely eliminated, the volume of fuel liquid in the amassment is maintainable constant and steady. Moreover, the operation of such container means positively counteracts the occurrence of hot spots and local boiling in the solution; any local region of liquid reacting too fast and becoming too hot, becomes less dense than the surrounding liquid and consequently is more rapidly forced centripetally toward the center of the vortex and out the liquid-outlet port, thus avoiding boiling or other trouble therefrom.

In short, by virtue of forcefully regimenting the encountered gas-evolution into a steady and stable effect, as well as sharply curtailing residence time of bubbles in the amassed solution, the instant technique substantially extends upwardly the specific power generation rates at which liquid reactors may practically be operated; hence, when employed in conjunction with pressurization and similar prior means for counteracting the bubble problem, liquid reactor operation well into the range of practical power production rates is liberally afforded. For example, such a system has proven eminently successful in practice as embodied in a full scale prototype reactor, adapted to serve as the ultimate power source of an electric generating plant, utilizing a circulating aqueous $U^{235}$-enriched uranyl sulfate solution, adapted to operate at a temperature of ca. 250° C., a pressure of 1000 p.s.i. and a reactor operational rate of 1000 kw. By having achieved successful operability, and by providing its significant advantages, the present means clearly represents a bold stride forward in the design of neutronic reactors.

In conducting the present method, the specific procedure employed to impart liquid rotation for establishing and maintaining the vortex, is subject to wide variation. For instance, driving the liquid with rotating mechanical impellers, constructed of low neutron-absorptive material such as aluminum, incorporated within the core, would be satisfactory. Particularly preferable, though, is the technique of maintaining liquid rotation by tangential introduction and axial discharge of a continuous stream of the fuel liquid through a closed core container. In this way, utter simplicity, avoidance of including neutron-absorptive extraneous materials within the core, and assurance that the essential rotation will necessarily continue throughout all times that any fuel liquid is being delivered in regular flow to the core, are achieved. For developing a smooth and steady vortex internal-unobstruction and an internal geometry of revolution are in order for the core container; in this respect, toward avoiding serious eddies, smoothness, regularity, and general convexity of the generatrix of such geometry is especially desirable. While closed cylinders, and prolate and oblate spheroids well satisfy these requisites, the sphere is particularly preferred, not only in that it provides an ideal geometry for stability of a vortex, but also, from the neutronic reaction standpoint, it affords the optimum geometry for minimizing the mass of fissionable material required for criticality. Accordingly, the choice means for conducting the present procedure, is a sphere with liquid inlet tangential, say in the "equatorial" plane, and with liquid outlets at one or both of the "poles." Generally speaking, the higher the velocity of liquid rotation in the vortex, the better; higher velocities lend themselves to a firmer and more stable vortex, a sharper and more uniform central cavity, and increased rate of gas separation from the liquid.

Likewise, the particular constitution of the chain reacting system to which the instant technique is applied is subject to considerable variation. Generally, any reactor system containing or circulating fissionable material in liquid form subject to gas evolution may be benefited. Such benefit extends to system using liquids, both inorganic and organic, which for the most part consistently suffer such radiation-induced decomposition into gases to undesirable degree; systems applying organic liquids, notably hydrocarbons, both as effective solvents for the fissionable material and as able moderators in view of high hydrogen content, are markedly susceptible to radiation decomposition, and thus are especially enhanced. The technique has proven particularly advantageous in cases where fissionable material contained or circulated is in aqueous solution or deuterium oxide solution form, wherein the water or deuterium oxide content serves as the principal neutron moderator. There, it is usually desired that the solution be constituted of a proportion of water or deuterium oxide sufficiently great to thoroughly attenuate the kinetic energy of the neutrons generated in the fission reaction such that the average energy level of neutrons in the core closely approximates that of thermal equilibrium at the ambient temperature. For this, molar ratios of water, or deuterium oxide to fissionable isotope greater than the order of 100 to 1 are appropriate, with the range of about 250–1000:1 being particularly preferred; the latter would amount to solution concentration of ca. 10–50 grams $U^{235}$ per liter. While these concentrations are of quite low fractional molarity, actual solution concentrations necessary to achieve them will be considerably greater where the fissionable isotope is associated with other non-fissionable isotopes of its polyisotopic element—for example, $U^{235}$ only partially freed of associated $U^{238}$. Furthermore, with manifold isotopic dilutions, solubility considerations unobjectionably often necessitate even greater ratios of water to fissionable isotopes—for example, with deuterium oxide solutions of natural uranium, comprising only about 0.7% $U^{235}$, molar ratios of $D_2O$ or water:$U^{235}$ within the higher range of 1,000–10,000:1 become necessary merely to effect complete dissolution. For constituting the solution, the fissionable material should best be in compound form, more particularly, in the form of a uranium or plutonium compound of high solubility and of staunch resistance to the heat and radiations to be encountered, and one which does not contribute components either excessively absorptive of neutrons or susceptible to intense radioactivation. Satisfactory in these respects are uranyl and plutonyl sulfates and nitrates. The volume of fuel solution necessary to constitute a critical mass varies with the parameters affecting the rates of consumption and loss of neutrons therefrom, e.g. geometry of the core container, relative volume of the vortex cavity, specific composition and nuclear properties of the solution, effect of solution impurities, identity of material of core container and other materials proximately surrounding the amassment, and the like. Such volume is quite accurately calculable, though, on the basis of known and accepted nuclear engineering theory; typically, for example, for a spherical core geometry, a slim vortex cavity, and a fuel solution comprising aqueous uranyl sulfate approaching isotopic purity in U–235 and within said preferred concentration range, an amassment of about 1½ to 2 feet in diameter would be adequate to provide a critical mass, while for uranium of natural isotopic constitution dissolved in deuterium oxide an amassment of about 35 to 40 feet in diameter or more would be needed. Toward further minimizing the necessary volume of the rotating amassment, it is preferred to jacket the amassment in a neutron reflector; several inches or so of an efficient neutron moderator such as graphite, beryllium oxide, beryllium metal, deuterium oxide or water is well suited. Upon thus providing a system susceptible to controlled chain fission reaction, it becomes appropriate to interpose a means for controlling the reaction rate—for example, the familiar rods or plates comprised of highly voracious neutrons absorbing materials such as cadmium or boron, adapted to be adjustably inserted into the core for setting and maintaining neutron flux level, and concomitantly rate of fissioning, at whatever intensity may be desired. Other features important to efficiency and safety, include the provision of withdrawal means for continuously tapping evolved gas from the vortex-cavity as it concentrates there, means for separately subjecting the withdrawn gas to controlled recombination to water and for thereupon returning it to the reactor core system, and heat-transfer means for extracting useful power generated by the reactor, preferably comprising circulation of the fuel liquid through an external heat exchanger.

A more comprehensive and detailed insight into the present method and means is afforded by consideration of the specific equipment and operations preferred by applicants. While practice of the present invention in accordance with the foregoing general outline is not limited to any specific design of neutronic reactor, the reactor system illustrated in the appended drawings, particularly Figs. 1 and 2 thereof, has proven to be eminently efficacious for the purpose.

The remaining four figures are diagrammatic sketches of special core tank arrangements for maintaining the vortex by tangential introduction of the liquid stream; specifically, Fig. 3 shows a simple core-tank with inlet in the equatorial plane.

Figure 1:
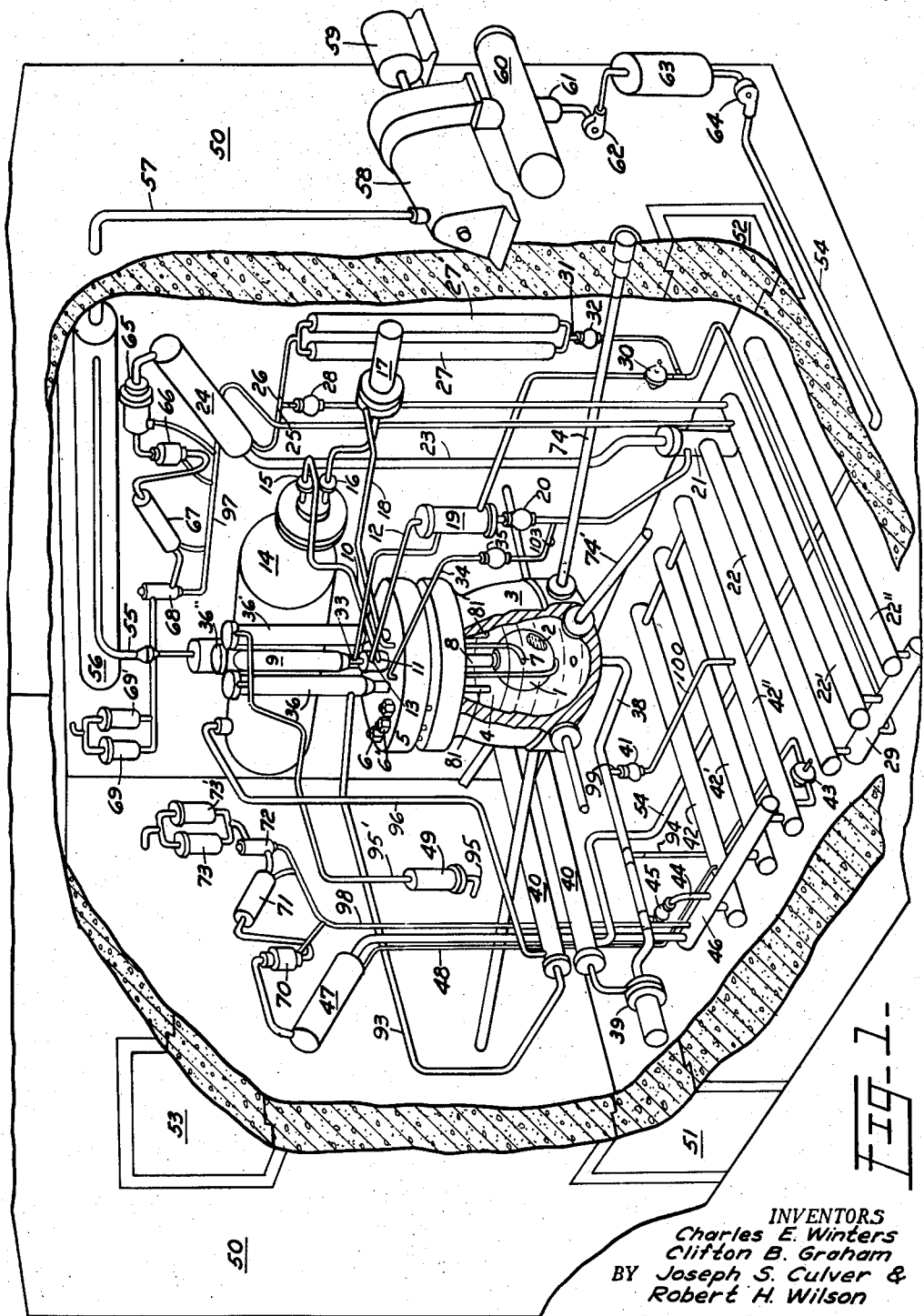
Fig. 1 is an overall assembly illustration of a circulating liquid fuel reactor adapted to operation and embodying apparatus in accordance with the present invention, together with electric generating equipment deriving its power therefrom, which altogether constitutes an integral, self-contained electric generating plant.
Figure 2:
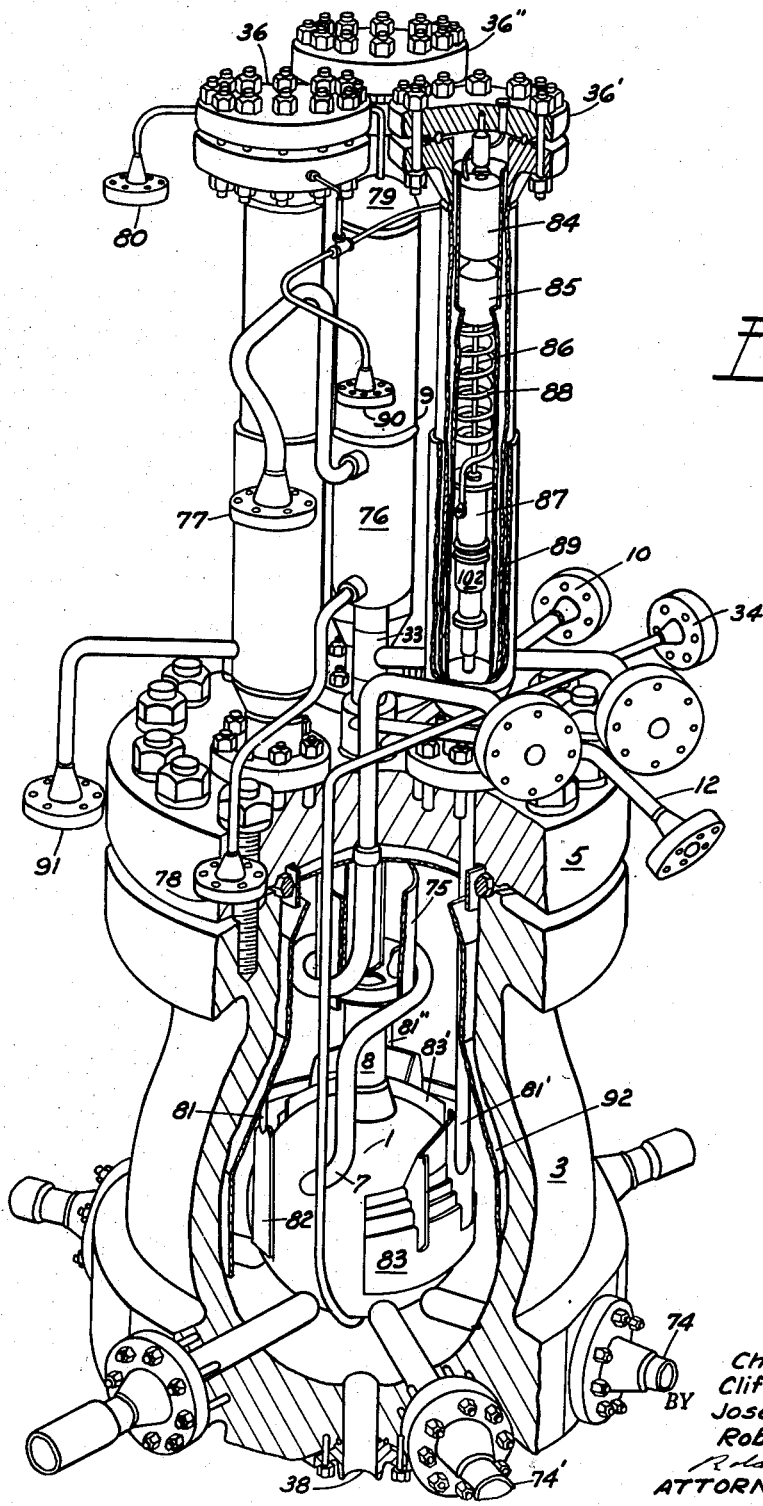
Fig. 2 is an enlarged cross-sectional illustration, in greater detail, of the core tank sub-assembly of the Fig. 1 reactor.

Fig. 4 shows internal details and the liquid flow pattern of the more complex core tank employed in the Fig. 1– Fig. 2 system.

Fig. 5 sets forth an optimum arrangement of optional special baffles for promoting advantageous liquid mixing within the vortex.

Figure 6 shows a simple core-tank with a plurality of inlets in the equatorial plane.

Fig. 7 is an enlarged sectional detail of the piping penetrating the walls of the surge standpipe member of the Fig. 1–Fig. 2–Fig. 4 system.

Fig. 8 is a sectional view of the expansion and pressurizer vessel surmounting the surge standpipe in the Fig. 1–Fig. 2–Fig. 4–Fig. 7 system.

Referring to the overall reactor-powered electric generating plant, illustrated in Fig. 1, a spherical core tank 1, pressure-tight and adapted to contain a supercritical amassment of an aqueous solution 2, of uranyl sulfate highly enriched in U-235, is disposed centrally within, and in spaced relation to, an outer pressure vessel 3, adapted to drainably contain a content of deuterium oxide 4, immersing the core tank 1. The pressure vessel 3 is provided with a removable, pressure-tight gasketed cover 5 retained securely by nutted stud bolts 6, 6'.

Communicating substantially tangentially into the side of core tank 1 is a uranium solution inlet 7, while from the top of the core tank, and in communication with the interior thereof, a uranium solution surge standpipe 8, vertically ascends through the pressure-tight cover 5 and leads directly into the bottom of a pressure-tight expansion and pressurizer vessel 9, surmounted upon the upper extremity thereof. Commencing at the upper periphery of the interior of the core tank 1 and disposed concentrically within, and internally spaced from, the surge standpipe 8,—as is detailed in cross-sectional Figs. 4 and 7—is a smaller-diametered uranium solution outlet pipe 10, which rises within the stand pipe 8 through the cover 5 and thereupon bends perpendicularly to, and leaves, the standpipe 8, through a pressure-sealed aperture 11, in the wall thereof. As may further be seen in Figs. 4 and 7, inside the uranium solution outlet pipe 10, an even smaller-diametered gas-liquid discharge tube 12, likewise commences at the upper periphery of the interior of the core tank 1, rises within the uranium solution outlet pipe through the cover 5, continues upwardly and passes through the wall of the uranium solution outlet pipe 10, where that pipe bends perpendicularly, and then itself bends perpendicularly and passes through the wall of the surge standpipe 8, through a second pressure-sealed aperture 13, in the wall of the standpipe 8. Outside of the standpipe 8, the uranium solution outlet pipe 10, proceeds to a tube-and-shell-type uranium solution heat-exchanger 14, where it is connected to the inlet 15, of a system of a multiplicity of U-shaped uranium solution conducting tubes (not shown) within the exchanger which ultimately discharges at the tube-side outlet 16, of the heat-exchanger 14. From such outlet 16, connecting piping leads to the inlet of an integrally-electrically-driven oil-cooled uranium solution centrifugal pump 17, which discharges into a uranium solution return pipe 18, which in turn leads back through the pressure-tight cover 5, and at its terminus forms said uranium solution inlet duct 7.

Meanwhile, the gas-liquid discharge tube 12, after leaving the surge standpipe 8, is connected into the tube-side of a tube-and-shell economizer heat-exchanger 19, which in turn discharges through a remotely-actuated uranium solution pressure-letdown throttling valve 20, into a steam-heated evaporator 21, integral with a plurality of elongated, slender, horizontal, external-water-coil-cooled, closed, cylindrical uranium solution storage tanks 22, 22', 22''. Upward from the evaporator 21, a vapor line 23, leads into a water-cooled uranium solution condenser 24. From the condenser, a condensate drain line 25, descends to a T 26, where it forks into two branches, one leading into a pair of condensate tanks 27, 27', suspended from a weighing scale system (not shown), while the other branch leads directly back to the system of uranium solution storage tanks 22, 22', 22''; the latter branch is provided with a remotely actuated valve, termed the "concentration valve," 28. The system of uranium solution storage tanks 22, 22', 22'', drains into a discharge manifold 29, which is connected by piping to the inlet side of a diaphragm pump 30, actuated by a line of pulsating hydraulic fluid energized by a remote pulsating piston pump (not shown). The condensate tanks 27, 27' drain into a condensate tank drain line 31, provided with a remotely-actuated valve, termed the "dilution valve" 32, which line terminates by teeing into the uranium solution piping leading from the discharge manifold 29, at the inlet to the diaphragm pump 30. The diaphragm pump 30, discharges through the shell-side of the economizer heat exchanger 19, and on into surge standpipe 8, through a T 33, therein. Connected to the bottom of the core tank 1, a uranium solution dump line 34 curves upward, proceeds through the pressure vessel cover 5, and leads to a remotely-actuated fast-acting uranium solution emergency dump valve 35; continuing from the dump valve 35, a uranium solution dump line extension 103 finally tees into the uranium solution piping at the low-pressure discharge side of pressure-letdown throttling valve 20.

Extending vertically upward from the pressure-vessel cover 5, and in fluid-transmissive communication with the interior of the pressure vessel 3, are three elongated, closed, tubular thimbles 36, 36', 36'', adapted to the disposition therein of lowerable control rods 81, 81' (rod from thimble 36'' not shown in Figure 1) adapted to have attached at their lower ends plates comprising cadmium and/or boron (not shown in Figure 1 in the interest of clarity; shown in Figure 2), for mechanically-driven adjustable insertion into the body of deuterium oxide 4, in close proximity of core tank 1.

Communicating with the interior, and descending from the bottom, of pressure vessel 3, a deuterium oxide outlet line 38 is connected to the inlet of an integrally-electrically-driven, oil-cooled deuterium oxide centrifugal pump 39, which discharges through the tube-side of a U-shaped tube-and-shell deuterium oxide heat exchanger 40, which in turn discharges through a deuterium oxide return pipe 93, and through a control rod thimble 36, back into the top of the pressure vessel 3. Teed from the deuterium oxide outlet line 38 a deuterium oxide outlet nipple 99 leads to a remotely-actuated deuterium oxide pressure-letdown throttling valve 41 from where a deuterium oxide discharge pipe 100 leads, to a plurality of elongated, slender, horizontal, external-water-coil-cooled, closed, cylindrical deuterium oxide storage tanks 42, 42', 42''; this tank system drains to the inlet of a deuterium oxide diaphragm pump 43, actuated, again, by a line of pulsating hydraulic fluid energized by a remote pulsating piston pump (not shown). The diaphragm pump 43, then discharges into a deuterium-oxide reintroduction pipe 94, teed back into the deuterium oxide outlet line 38, at a point farther down thereon, toward the deuterium oxide centrifugal pump 39. Still farther along the deuterium oxide outlet line 38, there is teed therefrom a deuterium oxide dump line 44, leading through a remotely-actuated quick-operating deuterium oxide dump valve 45 and connecting into a deuterium oxide vapor manifold 46, which is disposed over and connected into the top of the deuterium oxide storage tank system 42, 42', 42'', and is provided with a vapor line ascending to a water-cooled deuterium oxide condenser 47; a deuterium oxide condensate drain line 48, is provided for conducting deuterium oxide condensate back into the system of deuterium oxide storage tanks 42, 42', 42''. To pressurize the deuterium oxide 4, in pressure vessel 3, with high-pressure helium, a remote source (not shown) of high-pressure helium is connected by a helium delivery tube 95, through a steam-heated silica-gel absorber 49, and by a helium delivery tube extension 95', on into control rod thimbles 36, 36', the interiors of which are in fluid, transmissive communication with the interior of pressure vessel 3.

Enveloping the described, clustered apparatus is a radiation shield 50, comprising a special Barytes-containing concrete of several feet thickness, and fabricated of solid concrete blocks to afford removability, with only the outer courses thereof being mortared; removable access plugs 51, 52, 53 are provided in its walls and similar access plugs (not shown) are provided in its roof.

Penetrating the shield 50, a boiler feed water inlet pipe 54, is connected into the shell-side of the U-shaped deuterium oxide heat exchanger 40; this in turn discharges through a heated-water delivery pipe 96 into the shell side of the uranium solution heat exchanger 14. For conducting away the steam generated from the boiler feed water in the uranium solution heat exchanger 14, a steam line 55, connects from the top of the shell-side of the heat-exchanger 14 into a steam drum 56, from which a steam delivery pipe 57, passes out of the shield 50, and into connection with the inlet of a steam turbine 58. The turbine 58 is adapted to drive an alternating-current electric generator 59; both are disposed outside the shield 50. Steam from the turbine 58, discharges into a water-cooled steam condenser 60, connected to the hot-well 61, of which a hot-well pump 62, is provided for pumping steam condensate into a feed water storage tank 63, which in turn drains to a boiler feed water pump 64, which discharges into the aforesaid boiler feed water inlet pipe 54.

Returning attention to the gas-liquid discharge tube 12, the system beyond its letdown throttling valve 20 is adapted to afford escape of gas from liquid uranium solution at steam heated evaporator 21, whereupon the gases—predominantly hydrogen and oxygen in stoichiometric proportion for water formation—are adapted to pass off through vapor line 23 to accumulate in the top of uranium solution condenser 24. For removal and recovery of gases accumulating there, a non-condensable-off-gas line connects from the uranium solution condenser 24 into a gas recombination and recovery system comprising, in order: first a flame recombiner 65, containing a spark-gap passing a continuous electric spark into contact with which the gases are passed for controlled combustion of their hydrogen and oxygen content back into water; second, a catalytic recombiner 66, containing a heated bed of platinum-surfaced catalyst for further recombing any remaining uncombined water components; third, a water-cooled off-gas condenser 67; fourth, a Freon-refrigerated cold-trap 68; and finally a battery of parallel charcoal absorbers 69, 69' for absorbing any non-condensable radioactive gases, all backed up by a vacuum pump discharging into a tall meteorological smokestack for safe dispersal of any possibly-escaping radioactive gas to the atmosphere (neither shown). A suitable drain line 97, for conducting recombined water back into the uranium solution system, leads from the various components of the recombiner system. Likewise, for recombing any deuterium oxide decomposed into component gases, which would analogously accumulate in the top of the deuterium oxide condenser 47, a similar deuterium oxide recombiner system, comprising, in order, a deuterium oxide catalytic recombiner 70, a water-cooled deuterium oxide off-gas condenser 71, a Freon-refrigerated deuterium oxide cold-trap 72, a pair of deuterium-oxide-system charcoal absorbers 73, 73' which discharges through another vacuum pump to the tall smokestack (neither shown), and a suitable deuterium oxide drain line 98, for returning recombined deuterium oxide back into the deuterium oxide system, is provided.

Bridging from removable plugs in shield 50, horizontally penetrating through sealed apertures in the bottom of the pressure vessel 3, and terminating in closed ends just below the bottom of core tank 1, are several instrument tubes 74, 74' for affording removable insertion of radiation-measuring instruments (not shown) to the proximity of the core tank 1.

Not shown are thick vertical partition walls of shielding masonry which compartmentalize the several uranium solution and deuterium oxide circulation loops into respective separate cubicles, to enhance convenience, safety, and radiation-shielding effectiveness, or a maze of auxiliary water-cooling piping, sensory instrumentation for temperature, pressure, specific gravity, valve position telltale, and the like, and their telemetering lines, fluid lines for fluid-actuated diaphragm-controlled valves, an overall electrical system, apparatus structural supports, emergency standby cooling system, and the like, all of which are inherent, standard engineering adjuncts to liquid-processing and heat-power apparatus of the sort illustrated.

Referring to Fig. 2, an enlarged and more detailed illustration of the central core tank-pressure vessel-expansion and pressurizing chamber-control rod thimbles sub-assembly of the Fig. 1 reactor is presented in a partially cutaway view. Adhering to the Fig. 1 reference numeral system, with new numbers for further details, core tank 1, disposed in the pressure vessel 3, has tangentially communicating through its side the uranium solution inlet duct 7, which is looped completely around the surge standpipe 8, to afford ready linear thermal expansion of the duct. In communication with the interior of pressure vessel 3, and mounted upon the surge standpipe 8, is a catalytic recombiner 75, filled with catalyst pellets (not shown) for effecting recombination of decomposed deuterium oxide components directly within the pressure vessel 3. The surge standpipe 8, rises through the pressure vessel cover 5, and into the bottom of expansion and pressurizer chamber 9, which—as is further detailed in cross-sectional Fig. 8—comprises simply a steam-heated tube-and-shell heater portion 76, with steam inlet 77, and steam condensate outlet 78, directly surmounted by a vapor dome portion 79, having connected into its top a non-condensable-gas bleed vent 80. Symmetrically surrounding the expansion and pressurizer chamber 9, are the three vertical, cylindrical, closed-top control rod thimbles 36, 36', 36'', communicating with the interior of pressure vessel 3. Adjustably suspended from within are control rods 81, 81', 81'', having affixed at their lower extremities, respectively, a regulating shim plate 82, comprising highly-neutron-absorptive cadmium and/or boron, and fixtures of clustered pluralities of safety plates 83, 83', also comprising cadmium and/or boron curved as segments of vertical cylinders to closely fit, when in fully lowered position, around periphery of core tank 1. As shown in the representative cut away view of one control rod thimble 36', raising and lowering, as desired, of the control rod 81' therein is effected by an internal electric motor 84, driving a gear train 85, essentially rotating a nut on a non-rotating, vertical, threaded rod 86, the lower extremity of which rod has affixed thereto an electro-magnet 87, which attracts and thus releasably holds the top 102 of the control rod 81'. The electrical leads 88, of the electromagnet 87 are coiled spring-like within the thimble to provide ready extensibility. Water-cooled jacketing 89, is provided to cool the lower portion of each thimble to reduce the temperatures to which the electrical equipment is exposed. The internal construction and arrangements of each of the other two thimbles 36, 36", not shown cut away, are substantially identical with that of the thimble 36', shown cut away. for introducing fluids into the pressure vessel 3, through the control rod thimbles 36, 36', a helium inlet line 90, and a deuterium oxide inlet pipe 91, are teed into the thimbles. Having pressure fittings ready for connection with further piping are the uranium solution outlet pipe 10, the gas-liquid discharge tube 12, and the uranium solution dump line 34, as is the line leading to the T 33—as further detailed in cross-sectional Fig. 7—in the surge standpipe 8, for the introduction of make-up uranium solution. Spaced slightly from the interior walls of the pressure vessel 3, is a unitary flow liner 92, to direct the flow of incoming deuterium oxide first along the walls of the pressure vessel 3, to assure its adequate cooling. From the base of the pressure vessel 3, project deuterium oxide outlet line 38, and instrument tubes 74, 74'.

In the operation, in accordance with the present invention, of the overall system shown in Fig. 1 and as enlarged in part in Figs. 2, 7, and 8 a continuous stream of an aqueous solution 2, of uranyl sulfate highly isotopically enrich in U–235, is vigorously injected, through uranium solution inlet duct 7, tangentially into the interior of the core tank 1, wherein it produces rapid rotation of the contained solution, establishing a vertical vortex therein. The uranium solution 2, fills the surge standpipe 8, and further partially fills the expansion and pressurizer chamber 9, on up through its steam heater portion 76; there the heater 76, heats the local solution to 285° C. which continues to vaporize into the pressurizer vapor dome portion 79, until the equilibrium vapor pressure at that temperature of 1000 pounds per square inch is attained, which pressure is hydraulically transmitted through the solution in the surge standpipe 8, to the contents of the core tank 1, and throughout the remainder of the system with which it communicates. With the pressure vessel 3, filled to an adjustable level with deuterium oxide 4, to serve as a neutron reflector, the content of U–235 in the core tank 1, is sufficient to constitute a supercritical mass and to self-sustain a chain-fission reaction which generates heat at such a rate as to heat the stream of uranium solution flowing through the core tank to 250° C. The heated uranium solution axially leaves the core tank 1, through the annulus formed between the uranium solution outlet pipe 10, and the gas-liquid discharge tube 12 concentrically disposed therein, and passes through the tube-side of the uranium solution heat exchanger 14, there giving up its heat to, and boiling, the boiler feed water in the shell-side thereof, and from there passes through the uranium solution centrifugal pump 17, which discharges it back through the uranium solution return pipe 18, to the uranium solution inlet duct 7, and thus maintains vigorous circulation of uranium solution through such loop. Meanwhile, within the core tank, the radiation of the fission reaction continuously induces considerable water decomposition with copious evolution of gaseous decomposition products; in accordance with the present invention, the evolved gases centripetally migrate rapidly to the axial cavity of the vortex, from which they are continuously discharged, together with a relatively small portion of uranium solution effluent from the core, through gas-liquid discharge tube 12. Discharge through gas-liquid discharge tube 12, is effected sufficiently rapidly that the gas-filled vortex-cavity is maintained at all times slimmer than the mouth of the gas-liquid discharge tube 12 with which it registers, such that the cavity does not undesirably discharge gases into the uranium solution outlet pipe 10. From the gas-liquid discharge tube, the solution-gas mixture is then passed through the economizer-heat exchanger 19, to be cooled, and through uranium solution pressure-letdown throttling valve 20 to be throttled down to a pressure of only about 5 pounds per square inch, and on to the steam heated evaporator 21, where the solution is partially evaporated. The gas, together with evaporated water vapor, leaves through the vapor line 23, and passes to the uranium solution condenser 24, while the evaporator's distilland drains into the uranium solution storage tank system 22, 22' 22"; at the condenser 24, the water vapor is condensed, while the evolved gaseous decomposition products of water accumulate at the top of the condenser, and are continuously withdrawn and passed through the flame recombiner 65, catalytic recombiner 66, off-gas condenser 67, and liquid Freon cold-trap 68, to be recombined, condensed, and returned through the uranium solution drain line 97, on into a uranium solution storage tank 22' and thus to the uranium solution system; non-recombinable, non-condensable gases, comprising predominantly gaseous fission product species, are then largely absorbed in the battery of charcoal absorbers 69, 69'. The condensate from the uranium solution condenser 24 drains through the condensate drain line 25 whereupon it branches such that one portion drains into the condensate tanks 27, 27', while the rest drains into the system of uranium solution storage tanks 22, with the relative proportions of the branching depending on the setting of the "concentration valve" 28. Uranium solution is continuously pumped from the system of uranium solution storage tanks 22, 22', 22", by the uranium solution diaphragm pump 30, with the ongoing solution there becoming more or less diluted with water from the condensate tanks 27, 27', depending on the setting of the "dilution valve" 32 leading from the condensate tanks 27, 27'. From the pump 30, the uranium solution is discharged through the shell side of the economizer heat exchanger 19, to be reheated, from where it is routed through T 33, back through the surge standpipe 8, to the core tank 1. The foregoing operation of continuous partial distillation of the uranium solution and adjusted storage of the condensate in tanks for release through the dilution valve is particularly important in that it controls the precise concentration of the ongoing stream of uranium solution being pumped through the core. That is, on partially evaporating the uranium solution in evaporator 21, substantially plain water is continuously distilled off through vapor line 23, leaving a distilland of more concentrated uranium solution.

With "dilution valve" 32 closed and "concentration valve" 28 opened, the distilland and condensate both drain into the system of storage tanks 22, 22', 22", effecting no change in concentration therein. However, upon closing the concentration valve 28, with dilution valve 32 still closed, the distillate is routed to be retained in the condensate tanks 27, 27', and thus is restrained from returning to the tank system 22, 22', 22", resulting in a progressive increase in the concentration of the uranium solution being circulated through the core tank. Upon later reopening the concentration valve 28, the uranium concentration remains constant at its higher lever, in view of the water withheld therefrom in the condensate tanks; thereupon, the ongoing solution may be rediluted as desired by judicious opening of the dilution valve 32, with concentration valve 28 remaining open, thereby gradually draining condensed water into the outgoing uranium solution. Simply, therefore, the term "concentration valve" reflects the function of the valve 28, in serving to concentrate the circulating uranium solution upon its being closed from its normal open position, while the term "dilution valve" reflects the function of the valve 32, in serving to dilute the circulating uranium solution upon its being opened from its normally closed position. Since the condensate tanks are suspended from weighing scale means, the weight of condensate in the condensate tanks 27, 27' is readily determined to indicate the concentration of uranium sulfate in the remainder of the system at any given time. Such solution concentration adjustment is particularly significant here because the degree of reactivity of the solution in the fission reaction is sharply dependent upon the precise concentration of uranium solution in the core tank 1. Accordingly, remote manual adjustment—or, more conveniently, continuous automatic adjustment—of the settings of the concentration valve 28, and dilution valve 32, in response to the rate of fission in the core as indicated by radiation detection instrumentation disposed in instrument tubes 74, 74', while continuously circulating uranium solution through the core-evaporator-condensate-tank loop, is employed as the primary means for regulating the rate of fission reaction in the core in this reactor.

The uranium solution dump line 34, passing from the bottom of core tank 1 and closed by the uranium solution remotely-actuated quick-opening dump valve 35 affords rapid emergency emptying of the contents of the core directly to the system of uranium solution storage tanks 22, 22', 22''; the storage tanks 22, 22', 22'' are maintained at a pressure about a thousand pounds per square inch lower than that in the core tank 1, so as to effect hasty removal, and are of a quite-small-girthed elongated configuration—a geometry which precludes the fissionable fuel solution contents thereof from ever attaining criticality.

Pressure vessel 3, is maintained partially filled, normally to such a level as to keep the core tank 1, completely submerged, with deuterium oxide 4, which, in forming a ca. one foot thick jacket around the core tank 1, serves as a neutron-reflector for economizing neutrons in the chain reaction obtaining therewith. The portion of pressure vessel 3, above the deuterium oxide surface is maintained filled with helium at substantially 1020 p.s.i., a pressure slightly greater than that of the uranium solution in the core, such that upon any ruptuure of the core tank 1, all leakage will be inward, to avoid hazardous effusion of the fissionable material. The helium is delivered, from a remote high-pressure source, through the steam-heated silica gel absorber 49, for purifying the helium, and through helium inlet line 90, leading to the pressure vessel 3, through control rod thimbles 36, 36', thus pressurizing the deuterium oxide system. In operation, the deuterium oxide 4, in the pressure vessel 3, becomes progressively heated, through its contact with the hot core tank 1, through its attenuative reaction with neutrons emanating into it, and through its contact with the walls of the pressure vessel 3, which also become heated as the result of attenuative recation with neutrons and gamma rays. To dissipate such heat, the deuterium oxide is continuously circulated out of the pressure vessel through the deuterium oxide outlet line 38, then through the deuterium oxide centrifugal pump 39, which maintains the circulation, thereupon through the tube-side of the deuterium oxide heat exchanger 40, where the heat is transferred to the stream of boiler feed water flowing through the shell-side of the exchanger, and finally back into the pressure vessel 3. In re-entering the pressure vessel 3, the deuterium oxide flow is directed first against the inner walls of the pressure vessel by the flow liner 92, so as to avoid any impairment of the strength of the vessel through overheating. The deuterium oxide in the pressure vessel 3, is also subjected to intense ionizing radiation from the chain-reacting amassment in core tank 1, and consequently likewise suffers considerable decomposition into gaseous components. While the catalytic recombiner 75, mounted directly within pressure vessel 3, is normally effective in recombining decomposed deuterium oxide to a large measure, quite complete removal is insured by continuously discharging a portion of the circulating deuterium oxide stream from the deuterium oxide outlet line 38, through the deuterium oxide pressure-letdown throttling valve 41, into the system of deuterium oxide storage tanks 42, 42', 42'', which are maintained near atmospheric pressure. The gaseous decomposition products, along with any deuterium oxide vapor, pass to the deuterium oxide condenser 47, from where, after condensation of the deterium oxide vapor, the gases are withdrawn through the deuterium oxide catalytic recombiner 70, the deuterium oxide off-gas condenser 71, and the deuterium oxide cold-trap 72, where recovery by recombination and condensation of most all of the decomposed deuterium oxide is effected; finally, remaining non-condensable, non-recombinable radioactive gases are trapped in the deuterium oxide charcoal absorbers 73, 73', while any gases not trapped are meteorologically disposed to the atmosphere by discharge through the deuterium oxide vacuum pump to the tall smokestack. To replace the deuterium oxide continuously removed from the deuterium oxide outlet line 38, the deuterium oxide diaphargm pump 43, is employed to continuously pump deuterium oxide from the storage tank system 42, 42', 42'', back into the outlet line 38. It is particularly significant here that by adjusting the setting of deuterium oxide pressure-letdown throttling valve 41, the relative rate of deuterium oxide discharge from the outlet line 38 may be made greater than, equal to, or less than, the rate of continuous deuterium oxide replacement by diaphragm pump 43; in this way the deuterium oxide liquid level in the pressure vessel, 3, may be rapidly varied and precisely fixed at any desired height. Since the degree of reactivity of the chain reacting amassment in the core tank 1, is directly dependent upon the neutron reflecting agency of its enveloping bath of deuterium oxide, decreasing the level of the deuterium oxide reflector 4 and the degree of submergency therein of the core tank 1, has a pronounced effect in correspondingly decreasing reactivity of the amassment within the core tank. Therefore, remote manual—or, more conveniently, automatic—adjustment of the setting of the deuterium oxide throttling valve 41, again in response to the rate of fission reaction within the core tank 1, is employed as another efficacious means for regulating the overall rate of fission in this reactor. A quick-opening dump valve 45 is provided for rapidly emptying the deuterium oxide reflector from the pressure vessel 3, through deuterium oxide dump line 44, into the deuterium oxide vapor manifold 46, and on into the system of deuterium oxide storage tanks 42, 42' 42''; again, the fact that the storage tank system, 42, 42', 42'', is normally maintained at a pressure of almost 1000 pounds per square inch below that in the pressure vessel 3, promotes rapid emptying, and the quite-small-girthed, elongated configuration of the storage tanks geometrically preclude the attainment of a critical mass therewithin, even if the core tank were misfortunately to rupture and discharge its content of uranyl sulfate into the deuterium oxide system.

In the operation of the control rods 81, 81', 81'', safety plates 83, 83' are normally retained at their uppermost point of travel, away from the core tank 1, while the regulating shim plate 82 is usually maintained partially lowered into the vicinity of the core tank 1. The cadmium and/or boron in the regulating plate 82, voraciously absorbs neutrons which would otherwise be reflected back into the chain reacting amassment in the core tank, and thus alters the degree of reactivity of the amassment; moving the shim plate 82, upwardly or downwardly as desired through the drive means—i.e., electric motor 84, gear train 85, and threaded drive rod 86, in control rod thimble 36', and substantially identical apparatus and arrangement (not shown) in the other two control rod thimbles 36, 36''—is effected to roughly regulate the overall rate of fission in the reactor, especially in operation at very low power levels. Safety plates 83, 83' contain sufficient cadmium to render the amassment subcritical upon being lowered to their lowest point of travel immediately adjacent core tank 1; and may be lowered by their electric motor gear train to shut down the reactor gently when desired. Otherwise, for shutting down the reactor instaneously in an emergency, energizing electrical current to the electromagnets, such as 87, in the control rod thimbles, is switched off, causing both the safety plates 83, 83', and regulating shim plate 82, to drop by gravity to a lowest position adjacent core tank 1, thereby rendering the reactor immediately subcritical; such cutting of the energizing current to the electromagnet for abrupt shutdown is effectible both manually, and automatically by means responsive to excessive reaction rates through the agency of radiation-detection instrumentalities disposed in the instrument tubes 74, 74'. Subsequently, the dropped regulating and safety plates may be re-elevated by lowering the electromagnets until they contact the upper extremities of the control rods, whence re-energizing the electromagnets effects recoupling.

The short and direct connection of the core tank 1, to the expansion and pressurizing chamber 9, through the surge standpipe 8, affords prompt accommodation of surges in volume and pressure in the high-pressure uranium solution system; upon a surge, the uranium solution level merely rises further into the vapor dome portion 79, of the pressurizer, with the necessary space being thermodynamically provided by resulting vapor condensation; to avoid interference in this condensation mechanism, vapors are constantly bled from the top of the dome through gas bleed vent 80, to avoid accumulation of non-condensable gas therein. Within the vapor dome 79, a sensor 101—diagrammed in Fig. 8—comprising buoyant chamber and variable inductance transmitter telemeters indication of the precise liquid level in the pressurizer 9, in response to which the setting of the remotely-actuated uranium solution let-down throttling valve 20, is automatically adjusted so as to maintain a constant liquid level in the pressurizer.

For deriving useful power from the reactor in this system, boiler feed water is pumped from feed water storage tanks 63, by boiler feed water pump 64, via the boiler feed water inlet pipe 54, through the shield 50 and through the shell-side the deuterium oxide heat exchanger 40, where it is partially heated by the deuterium oxide. Thereupon, the heated feed water proceeds through the shell-side of the uranium solution heat exchanger 14, wherein, in contact with U-shaped tubes filled with circulating uranium solution at ca. 250° C., the water boils; resulting steam proceeds away through steam line 55, and accumulates in the steam drum 56. From there, the steam, upon directly leaving the shield through steam delivery pipe 57, is passed into the steam turbine 58, to empower the same, which in turn drives the alternating current electric generator 59, thereby producing the end product—electric power—of the entire plant. Finally, the steam turbine 58, is backed by a conventional water-cooled steam condenser 60; the condensed water accumulating in the hot well 61, of which is returned by hot well pump 62, to feed water storage tank 63, for reuse as boiler feed water.

Considering, more particularly, the special aspects and incorporated refinements in the reactor system illustrated in Figs. 1 and 2, uranyl sulfate has been found to possess eminent attributes especially favoring its selection as the form of the fissionable material to be employed. Over the operational range, the thermal stability of the sulfate salt is definitely assured; the phase diagram of the uranyl-sulfate-water system has been determined up to the critical point, and the system is found to remain homogenous at all concentrations up to 294° C. Also, notable radiation stability is exhibited; in aqueous solution, uranyl sulfate remained clear and unprecipitated upon irradiation in an operating neutronic reactor at a neutron flux of $5 \times 10^{11}$ neutron/cm.$^2$/sec. for so long as 2900 hours, thus giving indication of retaining radiation-stability indefinitely, although its aqueous solvent, of course, suffers considerable decomposition into its component gases. Advantageously, the sulfur atoms incidentally introduced have a neutron absorption cross-section so low as 0.4 barn, and hence are practically innocuous from a neutron absorption standpoint. Aqueous uranyl sulfate, however, is seriously corrosive to metals of construction; the problem is doubly deleterious since the corrosive action depletes the solution of sulfate ions, leading to the progressive precipitation of uranyl oxide, which represents hazardous accumulation of fissionable material as a highly-concentrated precipitate. However, stainless steel, especially No. 347, and zirconium have demonstrated staunch resistance to such corrosion; their use for all surfaces in contact with the sulfate has proven to largely obviate the difficulty. Among other applicable soluble compounds of fissionable material, uranyl nitrate exhibits good radiation stability and low propensity for neutron capture, but is subject to serious hydrolytic decomposition above about 175° C. wherein it evolves gaseous oxides of nitrogen in aggravation of the bubbling difficulties; accordingly, while aqueous uranyl nitrate is applicable below this temperature, it is rather unsuitable for the higher power generation rates. In the case of uranyl fluoride, although the fluorine atom is acceptable from a low neutron absorption standpoint, and the compound has been found thermally stable in general, although engaging in some hydrolysis to exert a hydrogen fluoride vapor pressure, up to 250° C., it exhibits inordinate corrosiveness—a detractive practical shortcoming.

Normal water is pre-eminent as the liquid moderant; deuterium oxide could also be effectively used, but normal water has a considerably shorter slowing down length for neutrons, so affords a smaller reactor core. Similarly for the reflector, natural water or else a solid such as beryllium, beryllium oxide, or graphite is suitable, while deuterium oxide is particularly preferred in that it is a drainable liquid affording enhanced mechanical convenience and safety, and that it has a neutron absorption cross-section per molecule ($\sigma_a = 0.0009$ barn) lower by ca. three orders of magnitude than that of natural water ($\sigma_a = 0.69$ barn) but a neutron scattering cross-section per molecule ($\sigma_s = 15.4$ barns) lower by only a factor of six than that of natural water ($\sigma_s = 94.1$ barns), and consequently is characterized by a commensurately greater ratio of $$\frac{\sigma_s}{\sigma_a}$$

representing superior reflectant quality.

An unusual and especially significant attribute of the illustrated reactor system for practical application is that it is inherently self-controlling with respect to reaction rate so as to minimize spurious changes in rate of reaction. The liquid fuel system will thermodynamically compensate for, and uneventfully adapt itself to accommodate with little change in rate of reaction, the occurrence of conditions tending to substantially change the degree of criticality and the rate of fission in the reacting system. This propitious characteristic is due predominantly to the exceptionally high negative temperature coefficient of the instant reactor system; that is, the degree of chain reactivity of the reactor varies to an unusually pronounced degree inversely to changes in the temperature of the fuel solution in the core. Simply, at the high temperature range employed in operation, uranyl sulfate solution density is a sensitive function of the temperature, decreasing pronouncedly with temperature increase, with corresponding liquid expansion; since the volume of the core tank is fixed, such expansion results in the displacement of a commensurate proportion of the fuel solutions from the core, and the consequent decrease in fissionable material content of the core serves to lessen the degree of chain reactivity of the amassment. Therefore, since the temperature of the fuel solution responds directly and virtually instantaneously to the rate of chain reaction, and since a surge standpipe and an expansion chamber of ample proportions are immediately affiliated with the core tank to permit unimpeded expansion of fuel solution from the core, any incipient upward excursion of reaction rate is immediately checked by the ensuing expansion and decrease in reactivity. As a result, the system is strongly resistive to alteration in reaction rate, and automatically counteracts and controls propensities toward increases in reactivity and rate of reaction much more potent than those which would completely destroy most other types of reactors. Consequently, the usual need for complicated, failure-proof, constantly-acting, high-speed control mechanism is avoided, while a reactor system of inherent safety eminently suited for common power plant practice is afforded. In addition, a general automatic response of reactor operation level to fluctuations in the demand of electric power and hence turbine steam is realized; increase in the rate of steam discharge to the turbine is accompanied by an increase in introduction of boiler feed water to the uranium solution heat exchanger 14, the resulting greater rate of cooling of the uranium solution tends to reduce the mean temperature of the fuel solution in the core, hence to increase its density, in turn to increase its fissionable material content, and thus to increase the rate of fission reaction, thereby tending to provide the additional thermal power demanded in the form of a considerable increased production of steam of somewhat lower temperature.

Extraordinarily, three independent means are provided for adjusting the rate of fission in order to insure continued positive regulation of the reaction. First, delicate regulation in reaction rate is made by adjusting the precise concentration of fissionable material in the circulating fuel solution, particularly through continuous distillation of aqueous solvent from the circulating uranium solution, and through the described operation of the concentration valve 28, and dilution valve 32, releasing into the oncoming stream at adjusted relative rates separately accumulated concentrated uranium solution and water appropriate for establishing the desired concentration. Response to this regulating means is generally rapid and oscillations of reaction rate around the desired level are quickly damped out, by virtue of the fact that ca. 75% of all uranium solution involved is within the core at any one time. Second, a coarser general regulation of reaction rate is effectible by adjustment of the depth of deuterium oxide neutron reflector covering the top of the core tank, through varying the setting of the deuterium oxide throttling valve 41. Finally, the third separate regulation means, largely for use in starting up and shutting down reactor operation, especially for emergency shutdown, resides in the vertically-movable regulating shim plate 82 and safety plates 83, 83', which afford insertion of sufficient quantities of highly-neutron-absorptive cadmium and/or boron in the proximity of the core, to render the amassment immediately sub-critical.

For a reactor system having general configuration and proportions as delineated in Fig. 2, the degree of effectiveness of each of the three separate regulation means, and other variations in operating conditions, with respect to the decrease in the number of neutrons from one successive generation to the next in the chain reaction which is effectible by each means, is set forth in Table I below.

TABLE I

EFFECT OF REGULATING MEANS AND VARIATIONS IN OPERATING CONDITIONS ON REACTIVITY

| Control Means | $\frac{\Delta k_{eff}}{k_{eff}}$ [1] |
|---|---|
| Uranium Solution Concentration Adjustment (Aqueous $UO_2(SO_4)_2$ at 30 gms. $U^{235}$/liter). | 1.05% per gm. $U^{235}$/liter. |
| Reflector Removal | −6½ −8%. |
| Control Plates (Full Insertion): | |
| Regulating Shim Plate | −0.42. |
| Safety Plates (each fixture) | −0.61. |
| Total | −1.64. |
| Variations in Operating Conditions: | |
| Change of Uranium Solution Temperature (At 250° C., free flow from core tank). | −0.17% per ° C. |
| Erraticalness of Bubbling of Evolved Gases | 0.1% Maximum. |

[1] $k_{eff}$=effective multiplication factor=statistical number of neutrons generated by fission in one generation per each neutron generated in the preceding generation—in other words, the number of neutrons actually completing the cycle of deceleration, thermal diffusion in core, capture by fissionable material, and fission, per one starting from fission.
$k$=multiplication factor=the $k_{eff}$ which would obtain if the particular core were extended to infinite size, so as to avoid the permanent escape of neutrons which occurs from a core of finite size.
$\Delta k_{eff}$=change in $k_{eff}$ produced by indicated adjustment of conditions.

The marked effect of reflector removal in decreasing reactivity is readily apparent; the extent of this effect in terms of the greater quantity of $U^{235}$ required to constitute a critical mass in the absence of the reflector is further demonstrated in Table II below.

TABLE II

EFFECT OF REFLECTOR REMOVAL AND CORE COOLING ON QUANTITY OF $U^{235}$ REQUIRED FOR CRITICALITY

| Core Temperature (° C.) | Reflector | $k$ Required for Criticality [1] | Critical Concentration [1] (gm. $U^{235}$/ kg. $H_2O$) | Critical Mass [1] (gm. $U^{235}$) |
|---|---|---|---|---|
| 250 | Full 100° C | 1.559 | 38 | 1,500 |
| 250 | Empty | 1.714 | 60 | 2,380 |
| 20 | Empty | 1.405 | 31 | 1,550 |

[1] In 18" diameter spherical vortex with slender central cavity.

In operation, the concentration of the uranyl sulfate solution is maintained within the aforesaid preferred range, sufficient deuterium oxide reflector is provided to fully immerse the core tank, and a sufficient degree of elevation of the regulating shim plate and complete elevation of the safety plates are maintained so as to establish criticality of the amassment and an equilibrium chain fission reaction proceeding at the desired reaction rate. For moderately increasing or decreasing the level of fission reaction rate, the uranium solution concentration is appropriately increased or decreased; for more extensive alteration of reaction rate, coarse adjustment of the general range of reaction rate by changing the depth of reflector and/or the elevation of the regulating shim plate, followed by fine adjustment by varying the uranium solution concentration, is in order. Upon shutdown of the reactor, reflector shim plate 82 and safety plates 83, 83', are fully inserted to their lowest positions, the deuterium oxide reflector 4 is completely drained from the pressure vessel 3, the uranium solution is diluted with the entire contents of the condensate tank 27, 27', and in addition all of the uranium solution is removed from the core tank to the system of uranium solution storage tanks 22, 22', 22", through dump line 34, and dump valve 35. For a panic shutdown in an emergency, first the regulating shim plate and the safety plates are immediately released and dropped by de-energization of their retaining electromagnets; the 1.22%

$$\frac{\Delta k_{eff}}{k_{eff}}$$

available in these plates is adequate for abruptly rendering the amassment momentarily sub-critical. However, upon so rendering the amassment sub-critical with the control rods alone, continued cooling of the uranium solution by the boiler feed water in the uranium solution heat exchanger rapidly increases the density of the circulating fuel liquid and concomitantly the total amount of fissionable material in the core tank, to the end that enough fissionable material would be progressively amassed to again attain criticality—despite the presence of the lowered regulating and safety plates—whereupon fission reaction would recommence, all frequently in less than a minute. While this interval of sub-criticality may well be considerably protracted by immediately cutting off any further introduction of boiler feed water or removal of steam from the uranium solution heat exchanger, so as to minimize the uranium solution cooling rate, nevertheless in any case the standard procedure is to immediately drain the deuterium oxide reflector so as to preclude the core from reattaining criticality; with proportions as illustrated and with a commercial quick-operating dump valve for the reflector, the deuterium oxide is found completely drainable in 20-30 seconds—ordinarily ample time for avoiding recommencement of the reaction. It is significant that in normal operation, also, the reaction exhibits the same recovery of criticality upon any amount of insertion of the regulating and safety plates; upon such insertion, the reaction then requires a denser and thus cooler uranium solution to sustain reaction, such that the final equilibrium effect of the plate lowering or raising is merely to decrease or increase, respectively, the temperature attained in the reaction, with little effect upon the rate of power generation by the reactor.

When employing stainless steel apparatus, especially for long time operation at high temperatures, it is highly advisable that positive steps be taken toward minimizing the deleterious effects of the corrosiveness of aqueous uranyl sulfate. Such corrosion, invariably accompanied by reduction of the uranium to tetravalent state leading to ultimate precipitation of all the uranium as oxide, may be largely overcome by pre-treating the stainless steel by contacting with a strong oxidant so as to form, apparently, an oxide coating thereon. For this, circulating either 1% $HNO_3$ or 2% chromic acid through the apparatus at 250° C. for from 4 to 24 hours has proven eminently efficacious. For maximum effectiveness, periodic repetition of such treatment, say every month or so, is advantageous. While the resulting corrosion resistance is not appreciably disturbed by mechanical abrasion, it tends to deteriorate under prolonged intense irradiation, as evidenced by progressively more pronounced uranium precipitation. In such case, it is effective to preserve the stability of the oxide coating under irradiation by incorporating a small amount of nitric acid, say to 1%, or other effective strong oxidant not otherwise interferent, in the circulating fuel liquid, although maintaining oxygen gas dissolved in the uranium solution at a concentration of the order of 20 to 100 parts per million is much less contributive to corrosive action and is the particularly preferred technique. Such concentration of dissolved oxygen may readily be provided by gradual addition of oxygen gas to the stream of uranium solution being returned from the uranium solution diaphragm pump 30, and proceeding to the T 33, in the surge standpipe 8. In a new installation, initial pre-treatment of the stainless steel with ca. 0.1 M HCl—$HgNO_3$ to remove grease and dirt, followed by a purifying wash of 50 hours with distilled water, is in order. In the reflector system, deuterium oxide is much less corrosive such that carbon steel is satisfactory as the reflector-containing pressure vessel; while deuterium peroxide promotes slight corrosion, this may be virtually completely inhibited with conventional agents, such as about 0.01 molar trisodium phosphate incorporated in the deuterium oxide bath.

In effecting recombination of the radiation-induced gaseous decomposition products of water, the operation of the flame recombiner involves simply passing the gases, comprising mostly hydrogen and oxygen in stoichiometric proportions, into contact with a spark maintained to induce their combustion, under controlled conditions, back to water. As the arriving gases are normally accompanied by considerable steam, volumetric proportions of gases in the steam must be maintained above the minimum required for combustibility; such minimum proportions, determined for various low temperatures and pressures, and also in the presence of a preponderant partial pressure of helium as is encountered in deuterium oxide decomposition products, are tabulated in Table III below.

TABLE III

MINIMUM PROPORTIONS FOR COMBUSTIBILITY IN $H_2$—$O_2$—He-STEAM ADMIXTURES

[$H_2$ and $O_2$ presented in stoichiometric proportions.]

| Temperature (° C.) | Total Pressure (p.s.i.a.) | Volumetric Proportions for Combustibility | | |
|---|---|---|---|---|
| | | Minimum Percent $H_2+O_2$ [1] | Percent He [2] | Percent $H_2O$ |
| 100 | 19.06 | 22 | 0 | 78 |
| 113 | 29.3 | 22 | 0 | 78 |
| 147 | 85.0 | 25 | 0 | 75 |
| 170 | 158 | 27 | 0 | 73 |
| 180 | 199 | 27 | 0 | 73 |
| 192 | 262 | 27 | 0 | 73 |
| 242 | 661 | 24 | 0 | 76 |
| 140 | 952 | 15 | 80 | 5 |
| 172 | 965 | 15 | 72 | 13 |
| 194 | 950 | 15 | 64 | 21 |
| 245 | 1,018 | 19 | 29 | 52 |

[1] Minimum necessary for combustibility upon spark discharge in 1050 ml., 3¾ in. diam. bomb.
[2] Sufficient helium incorporated to impose a total pressure approximating 1000 p.s.i.a. at the particular temperature.

To prevent flash-back of the explosion through the oncoming vapor line, the vapor best be first passed through a bank of orifices or nozzles, for example a closed-end metal tube of ¾ inch diameter perforated by 50–150 1/32 inch diameter holes, through which the steam-gas mixture jets at a velocity exceeding the flash-back velocity—generally about 13 feet per second at minimum—before encountering the spark. In addition, automatic flash back protection may be provided, if desired, by initially admixing excess steam with the gas sufficient to reduce the gas proportion below the combustibility minimum, and then providing a condenser to remove the excess steam just ahead of the flame recombiner; this precludes flame propagation any further back than the provided condenser. For the catalytic recombiner, eminent and satisfactory results have been realized with both carbon-base and alumina-base platinum catalysts. Preferably, though, a bed, maintained above 500° F. and better at ca. 750° F., of ⅛ inch by ⅛ inch cylindrical pellets of charcoal or activated alumina on which platinum has been deposited to a platinum content of the order of 0.3% to 1%, is effectively employed.

Removal of fission products, and addition of make up uranium, should not be necessary for some time after commencement of initial operation, since the rate of $U^{235}$ consumption and corresponding formation of fission products is only of the order of 0.001 gram per kilowatt-day of operation. However, upon attaining a concentration of fission products equal to about 1% of the fissionable material present, further increase in fission product concentration should be curbed by then commencing chemical processing of the fuel solution to remove fission products and plutonium. Conveniently, a portion of circulating uranium solution may be continually diverted, as a side stream, through a continuous reprocessing operation. In such operation, initially the solution should be purified of suspended solids by filtration. Then, the aqueous uranium solution is subjected to a conventional process for selectively removing fission product and plutonium values therefrom. Particularly preferred for this, for example, is a highly-developed continuous solvent extraction process comprising substantially acidifying the aqueous uranium solution with nitric acid, thereupon contacting with a liquid organic extractant comprising tributyl phosphate diluted with a hydrocarbon approximating kerosene to about 15–30% by volume, to thereby preferentially extract virtually all plutonium and uranium values from the fission-product-retaining aqueous solution, followed by preferentially stripping the extracted plutonium with an aqueous nitric acid solution containing a few hundredths molar ferrous sulfamate, and finally stripping the decontaminated uranium with plain water for subsequent reconstitution as uranyl sulfate and return to the reactor—as is described in greater detail in a co-pending application of the common assignee: S.N. 303,691, filed August 11, 1952, in the names of T. C. Runion, W. B. Lanham, and C. V. Ellison, for Process for Segregation of Plutonium, Uranium, and Fission Product Values.

Alternatively, the uranium solution may be percolated through a bed of cation exchange absorbent for preferential removal of plutonium values and of rare earth, strontium, cesium, and zirconium fission product species, and then through a bed of anion-exchange adsorbent for the preferential removal of anionic molybdenum, iodine, tellurium, and ruthenium fission products species—likewise conventional in the art.

Too, over protracted periods of operation, occasional reprocessing of the deuterium oxide reflector is beneficial for eliminating undesirable corrosion-product metal-ion contamination; simple distillation is satisfactory.

Returning attention to the remaining four figures (Figs. 3, 4, 5, 6), and considering especially the particular core tank configurations for establishing the essential vortex, Fig. 3 diagrams one of the simplest arrangements for producing and maintaining the vortex by means of introduction of the stream of fissionable material solution tangentially into the core compartment, while separately discharging solution and accumulated gases axially therefrom. Referring to Fig. 3, a spherical core tank 300, has connected thereto at its north pole, and communicating with the interior thereof, a vertical surge standpipe 301, which, in turn, has concentrically disposed therein and terminating at the periphery of the interior of the tank, a liquid discharge pipe 302, and a smaller gas discharge tube 303. In the equatorial plane of the spherical core tank, a liquid inlet duct 304 leads substantially tangentially to the interior of the tank. Connected at the south pole, a liquid drain pipe 305 leads from the tank. The tank is filled with an aqueous fissionable material solution 306, except for a central, gas-filled cavity 307, which forms in operation and aligns itself with the polar axis and registers with the end of the gas outlet tube 303, upon continuous and rapid introduction of a stream of the fissionable material solution through the inlet duct 304. Solution introduction in the equatorial plane, in this manner, has been found ideally adapted to establishing a firm and stable vortex having a cavity which assumes a steady alignment with the axial gas outlet orifice. However, experimentation has revealed that the exact alignment of the axis of the vortex, and with it the central cavity, is governed principally by the position of the liquid outlet from the sphere; with a polar liquid outlet, the vortex produced by location of the tangential inlet anywhere from "45° north latitude" through "45° south latitude" will still be precisely aligned with the polar axis. Moreover, even tilting the angle of tangential introduction to 45° "north" or "south" of the perpendicular to the line of the "longitude" of the point of introduction, has shown not to disturb the polar alignment of the vortex.

Beneficially making use of such findings is the refined and particularly preferred core arrangement of the Fig. 1–Fig. 2 system diagrammed in Fig. 4. Referring to Fig. 4, the core tank 1, is again precisely spherical, and, as in Fig. 3, is provided at its north pole with a concentric nesting of a surge standpipe 8, a liquid discharge pipe 10, and a gas-liquid discharge tube 12. Here, though, the surge standpipe is provided at its base with an ample flare 404, and is smoothly rounded at its juncture with the core tank; likewise the liquid discharge pipe includes a smoothly rounded flare 405 at its extremity. The gas-liquid discharge tube is provided with a broad, hemispherical, centrally-apertured nose 406, at its extremity, and integral liquid straightening vanes 407, adapted to curb continued rotation of liquid in the liquid discharge pipe after its egress from the core tank. The tangential liquid inlet duct 7, is in this instance located at ca. 45° north latitude, and is aimed with about a 30° southerly tilt with respect to a perpendicular to the line of the "longitude" of the point of introduction. Again, a liquid drain pipe 34, is provided at the south pole, and a vortex cavity 410 formed in operation, aligns with the polar axis and registers with the extremity of the gas-liquid discharge tube 12, at the aperture in its nose 406. Superimposed are dotted lines demarcating general regions of liquid migration, identified as A through E, and provided with arrows to indicate the general direction in which the liquid drifts in these regions, in addition to its rapid rotation (as indicated by the procession of large, three-dimensional, slab-like arrows), in proceeding to the liquid discharge pipe 10. In operation, the special positioning of the inlet duct directs the incoming liquid steam down through much of the Southern Hemisphere to promote continual mixing of liquid within the core, and to dispel deleterious relative stagnation, while still maintaining a steady vortex aligned with the polar axis. The flared and smoothed edges at the north pole orifices coincide with the lines of liquid flow and serve to mitigate any turbulence in the vortex that the outlets might induce. With the broad nose 406, of the extremity of the gas-liquid discharge tube, minor excursions of the vortex cavity from normal polar alignment are tolerated without adverse loss of any separated gases into the liquid discharge pipe 10; in practice, the vortex axis tends to precess slightly, whereupon the extremity of the cavity merely dwells momentarily upon the facade of the nose before returning to its normal registry with the orifice of the gas-liquid discharge tube. The straightening vanes 407, by converting liquid rotational motion within the liquid discharge pipe into axial flow, serve to salvage kinetic energy and thereby to reduce the pressure drop required to maintain the vortex. With such a spherical core tank of 18 inches diameter, operated at a solution flow rate of 100 gallons per minute, the pressure drop across the tank is only 15 p.s.i., and the afforded centrifugal force ranges from two times normal gravity at the equatorial periphery to 140 times gravity adjacent the central cavity. In a fission reaction therein at ca. 1000 kilowatts power level, gas evolution proceeds at a rate of ca. 400 cc. saturated gas at operating temperature and pressure per second; since the flowing solution becomes considerably supersaturated in dissolved gas, gas bubbles form and grow to separable size very rapidly, and are thereupon centrifugally forced to the cavity in a converging spiral flow path within the vortex, with an average bubble residence time in the rotating liquid of ca. ½ second. Communication of the liquid inlet duct with the core tank along a slight chord rather than precisely tangentially, as is often required to facilitate fabrication, has proven satisfactory; in such case, if desired, a baffle may be provided at the inlet to divert the entering liquid stream as a sheet tangentially jetting along the inner wall of the core tank, with some increase in rotational velocity being thereby achieved. Vertical disposition of the polar axis is preferable, although disposition of the axis in any spatial direction has proven satisfactory. With respect to the characteristics of liquid flow in the vortex generated by the Fig. 4 system, as delineated by the superimposed dotted lines, it is found that the entering liquid stream produces a turbulent region along the inner walls of the spherical tank. This region, designated as region "A," has the fundamental vortex rotation, but there is a considerable component of velocity along the sphere walls by-passing the heart of the reactor. Near the central axis of the sphere and surrounding the vortex cavity, there are three vaguely defined concentric cylindrical regions, "B," "C," and "D," respectively, wherein the direction of drift of the rotating liquid is up, down, and up, respectively. Between the outermost of the concentric cylindrical regions, "D," and the by-passing region "A" along the tank walls, is a region "E" wherein the liquid drift is predominantly centripetal. In the Northern Hemisphere, the migration in region "A" directly to the liquid outlet pipe results in some liquid short-circuiting the heart of the core; in the Southern Hemisphere, short-circuit drift in region "A" fosters the upward drift in region "D." The upward drift in inner region "B" seems fostered by a downward drift in the next outer region "C." The overall effect of these drifts on the primary centripetal migration is that the drifting liquid more rapidly shortcuts out of the core at the expense of some relative delay and overheating of the liquid which enters region "E." While this phenomenon may not be very serious at 1,000 kw. operation, it may ultimately prove particularly troublesome upon proceeding to operation at considerably higher power densities. For such contingency, it has been found that the phenomenon may be eliminated for the most part by disposing a few streamlined baffles, fins, or an inverted concentric bell-shaped palisade fixed in the bottom of the tank to divert part of the updraft in region "D" into region "E"; the best arrangement, though, comprises merely affixing a few slender horizontal rods extending from the tank walls to just short of the vortex cavity. In the case of the latter rods, the perpendicular liquid flow in passing produces a turbulent pressure loss behind them; the trailing low pressure area draws liquid through the stagnant region "E" and into the region "D" updraft, with wholesale mixing of the core contents ensuing, without significant obstruction of the liquid rotation.

The apparent optimum for such mixing rod arrangement is diagrammed in Fig. 5. Here again a tangential inlet 500 is disposed at ca. 45° north latitude, aimed 30° south of the perpendicular to the line of "longitude" of the point of introduction. A single slender radial rod 501, of length approximating 75% of the sphere's radius extends inward from the core tank wall, in the equatorial plane and at the 90th meridian from the inlet. A second slender radial rod 502, of the same length, is affixed at the 270th meridian, in the plane of the 30th parallel south. Also, at the 270th meridian, a third slender radial rod 503, only half as long as the others, is fixed in the plane of the 30th parallel north. Being cantilevered from the tank walls, the rods are preferably tapered slightly to reduce their susceptibility to resonance vibration and to increase strength at their base. Such arrangement gives evidence of constituting the minimum amount of rodding effective in bringing about effective destruction of the relative stagnation of region "E" in the dynamic vortex. Another method showing particular promise for promoting thorough mixing in the vortex comprises introducing a small supplemental stream of fuel solution in its colder inlet condition directly into the center of the vortex through the south pole drain pipe; being denser than the ambient hot solution at the center, the colder liquid is centrifugally thrown outward through the vortex promoting considerable turbulence and mixing in its trajectory.

Finally, Figure 6 diagrams a simple arrangement, paralleling that of Figure 3, but incorporating a plurality of tangential liquid inlet means. Referring to Figure 6, the core tank 600 is again precisely spherical, and, as in Figure 3, is provided at its north pole with a concentric nesting of a surge standpipe 601, a liquid discharge pipe 602, and a gas discharge tube 603, and also, at its base, a liquid drain pipe 604. The core tank 600 has a first tangential equatorial liquid inlet duct 605, and, diametrically opposite thereto, a second tangential equatorial liquid inlet duct 606. In operation, tangential introduction of liquid through both of the liquid inlet ducts 605, 606, operates to maintain vortical rotation of enhanced vigor within the core tank 600.

Further illustration of the quantitative aspects and preferred conditions and procedures of the present method and means is provided in the following specific example.

*Example*

A full-scale neutronic reactor, adapted to power an electric generating plant, substantially as illustrated in Figs. 1, 2, 7 and 8 and having a core-tank system as diagrammed in Fig. 4, has been constructed and successfully operated, as a prototype for like reactor systems of the same and much larger power production capacity, for both stationary industrial, and mobile propulsive applications. The general details of materials, dimensions, and operational parameters, both for operation of the reactor at design point—1000 kw. fission reaction rate—and at 20% of design point power—200 kw.—are tabulated in Table IV below.

TABLE IV

DESIGN AND OPERATIONAL DATA FOR REACTOR-POWERED ELECTRIC GENERATING PLANT AS ILLUSTRATED IN FIGURES 1, 2, 4, 7 AND 8

| Percentage of Design Point Reactor Operational Power Rate | 20% | 100% |
|---|---|---|
| Reactor: | | |
| Power Level | 200 kw. to | 1,000 kw. |
| Net Power Output | | 120 kw. |
| Gross Power Output | 20 kw | 140 kw. |
| Overall Efficiency | | 12%. |
| Volume of Core | 50 liters | |
| Power Density | 4 kw./l | 20 kw./l. |
| Fuel Material | $UO_2SO_4$ in water, 30 g./l., $U^{235}$ | |
| Percent Enhancement of Uranium in $U^{235}$ | 93.4% | |
| $U^{235}$ Consumption | 0.2 g./day | 1 g./day. |
| $U^{235}$ Required | 2100 g. | |
| Core Tank: | | |
| Inside Diameter of Core | 18 in. | |
| Thickness of Core Vessel | 3/16 in. | |
| Material of Core Vessel | 347 Stainless Steel | |
| Pressure in Core | 1000 p.s.i.a. | |
| Temperature in Core | 250° C. (482° F.) (Outlet) | |
| Fabrication | All welded construction | |
| Core Connections: | | |
| Inlet Duct | 1½ in. schedule 80* | |
| Outlet Pipe | 1½ in. schedule 80 | |
| Gas Outlet Pipe | ½ in. schedule 40 | |
| Surge Standpipe | 3 in. schedule 80 | |
| Drain Pipe | ¼ in. schedule 40 | |
| Reflector Pressure Vessel: | | |
| Inside Diameter of Pressure Vessel | 39 in | |
| Thickness of Pressure Vessel | 3 in | |
| Material of Pressure Vessel | Carbon Steel | |
| Material of Reflector | $D_2O$ | |

TABLE IV—Continued

| Percentage of Design Point Reactor Operational Power Rate | 20% | 100% |
|---|---|---|
| Reflector Pressure Vessel—Continued | | |
| Pressure in Reflector | 1,020 p.s.i.a | |
| Design Pressure | 2,000 p.s.i.a | |
| Diameter of Bottom Flange and Cover | 34½ in | |
| Thickness of Cover | 10 in | |
| Temperature in Reflector | 175° C | |
| Volume of $D_2O$, full Reflector | 450 liters | |
| Inert Gas in Reflector | Helium | |
| Solution Recirculating System: | | |
| A. Recirculation— | | |
| Flow Rate | 100 g.p.m | |
| Type Pump | Canned Armature Centrifugal Pump. | |
| Material of Pump | Stainless Steel | |
| Head at 100 g.p.m | 290 ft. water (102 p.s.i. at 250° C.) | |
| Efficiency | 34% | |
| Required Power | 13.2 kw | |
| Cooling Oil Requirements | 20 g.p.m. @ 5–10 p.s.i. pressure drop. | |
| Residence Time in Core Tank | 8 sec | |
| Total External Holdup of Recirculation System | 10 liters | |
| Holdup in Piping | 2–4 liters | |
| Holdup in Pump | 1 liter | |
| Percent Delay Neutrons Lost Externally | 16% | |
| Holdup in Uranium Solution Heat Exchanger | 5.5 liters | |
| Holdup in Pressurizer | 1.5 liters | |
| Residence Time in External System | 2 secs. | |
| Size of Piping | 1½ in. Stainless Pipe, Schedule 80 | |
| Velocity in Piping | 18 ft./sec. | |
| B. Uranium Solution Heat Exchanger | 200 kw. Level | 1,000 kw. Level. |
| Temperature of Solution, In | 482° F | 482° F. |
| Temperature of Solution, Out | 467° F | 407° F. |
| Operating Steam Pressure | 458 p.s.i.a | 210 p.s.i.a. |
| Operating Steam Temperature | 458° F | 386° F. |
| Type of Heat Exchanger | Shell and U Tube Steam Generator. | |
| Materials | Stainless Tubes, Steel Shell | |
| Tubing | ¼ in. O.D., 18 gage | |
| Outside Heat Transfer Area of Tubes | 75.5 sq. ft | |
| Number of Tubes | 112 | |
| Length of Each Tube | 100 in. average length | |
| Length of Heat Exchanger | 7 ft | |
| Diameter of Shell | 26¼ in. I.D | |
| $H_2O$ in Heat Exchanger | 500 lbs | |
| Pressure Drop of Solution Across Exchanger | 25 p.s.i | |
| Velocity Through Tubes | 15.8 ft./sec | |
| C. Pressurizer— | | |
| Operating Pressure | 1,000 p.s.i | |
| Design Pressure | 2,000 p.s.i | |
| Operating Temperature | 285° C. (545° F.) | |
| Construction | 347 stainless 6 in. schedule 120 pipe. | |
| Volume of Vapor Space | 0.364 cu. ft | |
| Heat Input Capacity | 10 kw | |
| Steam Pressure to Pressurizer | 1,500 p.s.i | |
| D. Gas Separator and Recombiner: | | |
| Rate of Gas Evolution ($H_2+O_2$) (saturated) (1,000 p.s.i., 250° C.). | 80 cc./sec. Maximum | 400 cc./sec. Maximum. |
| Heat of Recombination | 12 kw. Maximum | 58 kw. Maximum. |
| Percent of Core Volume as Gas | 0.08 | 0.4. |
| Bubble Residence Time in Core (secs.) | ½ | ½. |
| Reflector Recirculating System: | | |
| A. Recirculation— | | |
| Flow Rate | 26 g.p.m | |
| Type Pump | Canned Armature Centrifugal Pump. | |
| Materials of Pump | Stainless steel | |
| Head at 30 g.p.m | 83 ft. of water (36 p.s.i. at 100° C.) | |
| Efficiency | 40% | |
| Required Power | 3.7 to 4.6 kw | |
| Cooling Oil Requirements | 10 g.p.m. @ 3–5 p.s.i | |
| Residence Time in Reflector | 240 sec. (reflector full) | |
| Residence Time, External Circuit | 15 sec | |
| External Hold-up | 25 liters | |
| Piping | 1.5 to 3 liters | |
| Pump | 1 liter | |
| Heat Exchanger | 20 liters | |
| Size of Piping | 1 in., Schedule 40, 347 stainless steel. | |
| Velocity in Piping | 11.6 ft/sec | |
| B. Deuterium Oxide Heat Exchanger | 200 kw. Level | 1,000 kw. Level. |
| Heat Load | 60–75 kw | 132 kw. |
| Temperature in Reflector | 150° C. min | 150° C. min. |
| Temperature Boiler Feed Water, In | 101° F | 101° F. |
| Pressure, $D_2O$ Side | Entering, 1,051 p.s.i / Leaving, 1,020 p.s.i | Entering, 1,051 p.s.i. Leaving, 1,020 p.s.i. |
| Pressure, Water Side | 500 p.s.i.a | 220 p.s.i.a. |
| Type of Heat Exchanger | Double Pipe, Stainless Steel | |
| Area | 56 sq. ft | |
| Overall Heat Transfer Coefficient | 280 B.t.u./hr. ft.² ° F | |
| Pressure Drop, $D_2O$ | 41.2 p.s.i | |
| Power Cycle: | | |
| Flow Rate Boiler Feed Water | 1.2 g.p.m | 6 g.p.m. |
| Steam | 600 lb./hr | 3,025 lb./hr. |
| Head | 315 p.s.i.a | 200 p.s.i.a. |
| Turbine-generator Rating | | 250 kw. |
| Boiler Feed Water Pump Power | 5 H.P | 5 H.P. |
| Type Boiler Feed Water Pump | Parallel Combination—electric powered piston pump, and turbine pump | |
| Turbine Condenser Load | 500,000 B.t.u./hr | 3,000,000 B.t.u./hr. |
| Turbine Condenser, Operating Pressure (design) | 2 in Hg | |
| Turbine Condenser, Water In | 70° F | |
| Turbine Condenser, Water Out | 90° F | |
| Turbine Condenser, Water Flow | 100–300 g.p.m | 300–600 g.p.m. |
| Turbine Condensate Temperature | | 101° F. |
| Turbine Condenser, Water Main Size | 5 in. | |
| Turbine Condenser, Steam Main Size | 4 in., schedule 60 | |

TABLE IV—Continued

| Percentage of Design Point Reactor Operational Power Rate | 20% | 100% |
|---|---|---|
| Dump System and Storage System: | | |
| A. Uranium Solution Storage System— | | |
| Total Volume of Storage Tanks | 268 liters | |
| Configuration of Storage Tanks | 2 std, 8 in. stainless pipes on 21 in.+centers, in parallel. | |
| Total Length of Pipe | 25 ft. 6 in. | |
| Types of Uranium Solution Pressure-Letdown Throttling Valve. | diaphragm-actuated ⅛ in. valve. | |
| Time for Emergency Dumping | 1 min | |
| Design Pressure of Storage Tanks | 1,500 p.s.i. | |
| Operating Pressure of Storage Tanks | 23 p.s.i. | |
| Evaporator: | | |
| Type | Natural Convection, Double Pipe. | |
| Rate of Evaporation | 130 lb./hr. using 60 p.s.i.g. steam. | |
| Condensate Tanks: | | |
| Construction | 8 in. schedule 40 347 stainless pipe. | |
| Total Volume | 153 liters | |
| Uranium Solution Diaphragm Pump | Diaphragm with multiple check valves above and below: | |
| Head | 1,000 p.s.i. | |
| Flow Rate | 1.15 g.p.m | |
| Suction Pressure | 5 ft. $H_2O$ | |
| Load | 5 H.P. | |
| Economizer Heat Exchanger: | | |
| Type | Coil Tube, and Shell | |
| Flow Rate | 1 g.p.m | |
| Rate of Heat Removal | 10,000 B.t.u./hr | |
| Condenser: | | |
| Cooling Water Flow | 5 g.p.m | |
| Area | 27 sq. ft. | |
| Overall Heat Transfer Coeff. | 85 B.t.u./hr. ft$^2$., ° F | |
| Maximum Heat Load | 150,000 B.t.u./hr | |
| Required Head, Water | 10 ft | |
| Size Water Main | 2 in. pipe | |
| Temperature Cooling Water | 80° C. | |
| Temperature Vapor Side | 194° F | |
| B. Reflector Dump and Storage Systems— | | |
| Total Volume | 166 gals. | |
| Configuration of Deuterium Oxide Storage Tanks | 63 ft., 4 in. of 8 in. schedule 40 347 stainless pipe on 21 in.+ centers. | |
| Pressure Vessel Discharge Pipe | 4 in. | |
| Size $D_2O$ Pressure letdown Throttling Valve | ⅛ in. | |
| Design Pressure of $D_2O$ Storage tanks | 970 p.s.i. | |
| Operating Pressure or $D_2O$ Storage Tanks | 15 p.s.i. abs. | |
| Time of Dumping, 1,000 p.s.i. | 10–30 sec. | |
| Deuterium Oxide Diaphragm Pump | Diaphragm pump with multiple check valves above and below. | |
| Head | 1,000 | |
| Flow Rate | 2 g.p.m | |
| Shield: | | |
| Composition | Structural concrete, comprising Portland cement, barytes as aggregate, together with colemanite to provide 1% boron by weight and water. | |
| Thickness | 7 ft. | |
| Controls: | | |
| Number of Regulating Plates | 1 | |
| $\Delta k_{eff}/k_{eff}$ of Regulating Plates | 0.42% | |
| Number of Safety Plates Fixtures | 2 | |
| $\Delta k_{eff}/k_{eff}$ of each Safety Plates Fixtures | 0.61% | |
| Weight of each Plate | 30 lbs. | |
| Length of travel | 18 in. | |
| $\Delta k_{eff}/k_{eff}$ of reflector between Full and Empty | 6½–8% | |
| Time to fill Reflector (min) | 120 | |
| Method of level control | Automatic and also Manual remote. | |
| Temperature Coefficient of $k_{eff}$ at 250° C. Free flow from Core. | −0.17% °C | |
| Minimum time for complete withdrawal of plates | 120 seconds | |

| | Flux Neutrons/cm.$^3$ sec | | | |
|---|---|---|---|---|
| | 200 kw. Level | | 1,000 kw. Level | |
| | thermal | epithermal** | thermal | epithermal |
| Neutron Flux (approximated): Location— | | | | |
| Core | 4×10$^{12}$ | 7×10$^{12}$ | 1.9×10$^{13}$ | 3.7×10$^{13}$ |
| Reflector (inner edge) | 2×10$^{12}$ | 5×10$^{12}$ | 9×10$^{12}$ | 2.3×10$^{13}$ |
| Reflector (outer edge) | 1.4×10$^{11}$ | 8×10$^{10}$ | 7×10$^{11}$ | 4×10$^{11}$ |
| Total Neutrons | 1.5×10$^{16}$ | neut./sec | 7.5×10$^{16}$ | neut./sec |

| Fission Products—1,000 kw. operation: | |
|---|---|
| Equilibrium total quantity of fission products | ca. 2×10$^6$ curies |
| Rate of formation of gaseous fission products | ca. 1.5 cc./hr., STP |
| Equilibrium absorber content | ca. 5×10$^3$ curies |
| Xenon-135 stripping, 40 cc./sec. $H_2+O_2$ @ (200 kw) | ca. 99+ percent |
| Xenon-135 stripping, 0.4 cc./sec. $H_2+O_2$ | ca. 95% |
| Xenon-135 removal, equilibrium, 22.4 l vapor space | ca. 96% |
| U-235 Consumption=weight fission products | ca. 1 g./day |

* "Schedule" is employed, in customary manner, for conventional definition of the dimensions, weights, and sizes of steel pipe in accordance with the accepted A.S.A. Standard B-36.10-1939, American Standards Association, New York, N.Y. (cf. Chemical Engineer's Handbook, edited by J. H. Perry, third edition, pages 413–416 et seq., McGraw-Hill, 1950).

** By accepted and conventional definition, "epithermal neutrons" are neutrons with energies above thermal energy (cf. The Elements of Nuclear Reactor Theory, Glasstone and Edlund, page 36, Sec. 3.13, Van Nostrand, 1952).

Although this invention has been described with particular emphasis upon the rather highly developed specific reactor design, suitable for practical application, outlined in the drawings, it is inherently susceptible to wide variation. For example, while utilization of a single tangential inlet to sustain the vortex has been stressed, in higher-power operation use of a plurality of tangentially inlets, say four, symmetrically spaced around the equator, and associated with a pair of outlets, one at each pole, would be advantageous. Too, for projected operation within the 100,000–250,000 kw. power-production range, where core tank diameters of 6 to 9 feet would be required, deuterium oxide displaces natural water with respect to preferability as the liquid moderant; there with quite large core sizes, the importance of shortness of slowing down length of the moderant recedes, whereupon deuterium oxide's greater value of moderant microscopic efficiency $$\frac{\xi \sigma_s}{\sigma_a}$$

assumes primary significance. Furthermore, while operation with isotopically impure fissionable material, such as U–235 accompanied by U–238 is often advantageous in that U–238 becomes transmuted under the neutron bombardment to Pu–239, thereby generating new fissionable material, nevertheless other advantages such as achieving minimum reactor size and weight is afforded by operation with a completely isotopically isolated fissionable isotope—such as isotopically pure U–235— whereupon no such transmutation to Pu–239 will obtain. On the other hand, the present system is readily adapted to extensive production of new fissionable material during operation, by merely enlarging the reactor core and incorporating a fertile material, such as natural thorium (Th–232) in the reflector; thereupon, the high neutron flux transmutes the Th–232 to Th–233, which forthwith spontaneously decays, through Pa–233, to fissionable U–233, which may be continuously recovered during operation. Other variations and applications of the hereinbefore-disclosed method and means will become apparent to those skilled in the art. It is, therefore, to be understood that all matters contained in the above description and example are illustrative only, and do not limit the scope to the present invention.

What is claimed is:

1. In a neutronic reactor comprising a liquid containing fissionable material adapted to continuously flow as a stream through a container means and to engage in self-sustaining chain fission reaction, with concomitant substantial gas evolution, while maintained in a compact amassment within said container means, improved container means which comprises: an internally-unobstructed closed container geometrically defining as its interior a volume of revolution about a principal axis through said interior; a liquid-inlet duct means communicating substantially tangentially with the interior of said container in a direction generally approximating that of the geometric revolution of said volume; means defining a gas-outlet port substantially axially concentric with, and at an axial extremity of, said container; and means defining an annular liquid-outlet port substantially axially concentric with, at the same axial extremity with container as, and surrounding, said means defining a gas-outlet port.

2. For improved operation of a neutronic reactor comprising a liquid containing fissionable material adapted to be maintained in a compact amassment, and while so amassed to engage in self-sustaining chain fission reaction with concomitant substantial gas evolution, a method which comprises maintaining said liquid in said compact amassment in rotational flow about a principal axis of the amassment at a sufficient velocity to provide a vortex by continuously flowing said liquid as a stream through said amassment, therein introducing said stream of liquid forcefully into said amassment tangentially at the periphery of said vortex and discharging said stream axially from said vortex, and discharging evolved gas as it concentrates within the cavity of the vortex.

3. The method of claim 2 wherein said liquid containing fissionable material is a solution of fissionable material dissolved in a liquid solvent selected from the group consisting of water and deuterium oxide.

4. The method of claim 2 wherein said liquid containing fissionable material is an aqueous solution of fissionable material.

5. Method of claim 2 wherein said amassment in rotational flow is maintained substantially spherical in configuration.

6. The method of claim 2 wherein said liquid containing fissionable material is an aqueous solution of uranyl sulfate, the uranium constituent of which is highly isotopically enriched in uranium–235.

7. The method of claim 2 wherein said liquid containing fissionable material is an aqueous solution of uranyl sulfate, the uranium constituent of which is highly isotopically enriched in uranium–235, maintained at approximately 250° C. temperature and approximately 1,000 p.s.i. pressure.

8. The method of claim 2 wherein said provided vortex is surrounded by a drainable body of liquid neutron reflectant.

9. The method of claim 2 wherein said provided vortex is surrounded by a drainable body of liquid deuterium oxide.

10. The method of claim 2 wherein said liquid containing fissionable material comprises a solution of fissionable isotope in a liquid solvent selected from the group consisting of water and deuterium oxide, with the molar ratio of said solvent to fissionable isotope in the solution maintained within the range of 250:1 to 1000:1.

11. The method of claim 2 wherein said liquid in said amassment is maintained contiguous with a body of the same liquid in an expansion reservoir means external said amassment, said reservoir means being adapted to afford direct and substantially unimpeded egress from said amassment of excess liquid content upon expansion of the liquid in said amassment, and like ingress into said amassment of restitutory liquid upon contraction of said amassment.

12. The method of claim 2 wherein the liquid in said amassment is maintained under substantial superatmospheric pressure by heating a body of said liquid contiguous with, and external to, said amassment, and disposed in a closed, pressure-tight container communicating with said amassment, whereupon the resulting increased vapor pressure of said heated liquid is transmitted hydraulically by said body of liquid to the liquid in said amassment contiguous therewith.

13. For improved operation of a neutronic reactor comprising a liquid containing fissionable material adapted to be maintained in a compact amassment, and while so amassed to engage in self-sustaining chain fission reaction, with concomitant substantial radiation-induced decomposition of said liquid into gaseous components, a method which comprises maintaining said liquid in said compact amassment in rotational flow about a principal axis of the amassment at a sufficient velocity to provide a vortex by continuously flowing said liquid as a stream through said amassment, therein introducing said stream of liquid forcefully into said amassment tangentially at the periphery of said vortex and discharging said stream axially from said vortex, thereupon discharging decomposition gases as they concentrate with the cavity of the vortex, and thereafter effecting chemical recombination of the resulting discharged gaseous components, thereby reconstituting said liquid therefrom.

14. The method of claim 13 wherein said liquid containing fissionable material is a solution of fissionable material in a liquid solvent selected from the group consisting of water and deuterium oxide, wherein said radiation-induced decomposition is that of said liquid solvent into hydrogen, oxygen, and hydrogen peroxide, and wherein said recombination is effected by combustion of the discharged gases to reconstitute said liquid solvent therefrom.

15. The method of claim 13 wherein said liquid containing fissionable material is a solution of fissionable material in a liquid solvent selected from the group consisting of water and deuterium oxide, said radiation-induced decomposition is that of said liquid solvent into hydrogen, oxygen, and hydrogen peroxide, and wherein said recombination is effected by contacting said discharged, admixed gaseous components with a heated catalyst comprising a layer of platinum deposited upon the surface of an adsorptive underbody selected from the group consisting of activated charcoal and activated alumina, to reconstitute said liquid solvent therefrom.

16. For an improved operation of a neutronic reactor comprising a liquid containing fissionable material adapted to be maintained in a compact amassment, and while so amassed to engage in self-sustaining chain fission reaction and consequently to become heated from an initial cooler, denser condition to a final warmer, less dense condition, with concomitant gas evolution, a method which comprises: maintaining said liquid in said compact amassment in rotational flow about a principal axis of the amassment at a sufficient velocity to provide a vortex, by passing said liquid as a continuous stream through said amassment, therein continuously introducing forcefully a preponderant portion of said stream of liquid, in said initial cooler, denser condition, tangentially at the periphery of said vortex, continuously discharging said stream, in said warmer, less dense final condition axially from said vortex, and continuously introducing the remaining minor proportion of said stream of liquid in initial cooler, denser condition axially into said vortex whereupon by virtue of being denser than the ambient warmer, less-dense liquid in the inner regions of the vortex it is forcefully thrown outward through the vortex toward the periphery thereof under the centrifugal influence of the liquid rotation thereupon, consequently promoting considerable advantageous turbulence and mixing in its trajectory; and discharging evolved gas as it concentrates within the cavity of the vortex.

17. The improved container means of claim 1 wherein said geometric volume of revolution about a principal axis is substantially a sphere.

18. The improved container means of claim 1 wherein said geometric volume of revolution is a sphere having said principal axis as its polar axis, and wherein said substantially tangential communication of said liquid inlet-duct means is effected in the equatorial plane of said sphere.

19. In a neutronic reactor comprising a liquid containing fissionable material adapted to continuously flow as a stream through a container means and to engage in self-sustaining chain fission reaction, with concomitant substantial gas evolution, while maintained in a compact amassment within said container means, improved container means which comprises: an internally-unobstructed closed container geometrically defining as its interior a volume of revolution about a principal axis through said interior; a body of drainable liquid neutron reflectant immersing said container; liquid-inlet duct means communicating substantially tangentially with the interior of said container in a direction generally approximating that of the geometric revolution of said volume; means defining a gas-outlet port substantially axially concentric with, and at an axial extremity of, said container; and means defining an annular liquid-outlet port substantially axially concentric with, and at the same axial extremity of said container as, and surrounding, said means providing a gas outlet port.

20. The improved container means of claim 19 wherein said liquid neutron reflectant is deuterium oxide.

21. In a neutronic reactor comprising a liquid containing fissionable material adapted to continuously flow as a stream through a container means and to engage in self-sustaining chain fission reaction, with concomitant substantial gas evolution, while maintained in a compact amassment within said container means, improved container-means which comprises: an internally-unobstructed closed container geometrically defining as its interior a volume of revolution about a principal axis through said interior; a drainable body of liquid neutron reflectant immersing said container; means for adjusting the depth to which said body of liquid neutron reflectant immerses said container; liquid-inlet duct means communicating substantially tangentially with the interior of said container in a direction generally approximating that of the geometric revolution of said volume; means defining a gas-outlet port substantially axially concentric with, and at an axial extremity of, said container; and means defining an annular liquid-outlet port substantially axially concentric with, and at the same axial extremity of said container as, and surrounding, said gas-outlet port.

22. In a neutronic reactor comprising a liquid containing fissionable material adapted to continuously flow as a stream through a container means and to engage in self-sustaining chain fission reaction, with concomitant substantial gas evolution, while maintained in a compact amassment within said container means, improved container-means which comprises: an internally-unobstructed closed container geometrically defining as its interior a volume of revolution about a principal axis through said interior; a drainable body of liquid neutron reflectant immersing said container; means for adjusting the depth to which said body of liquid neutron reflectant immerses said container; a mass of highly-neutron-absorptive material adapted to adjustable insertion in said body of liquid neutron reflectant into close proximity of said container; liquid-inlet duct means communicating substantially tangentially with the interior of said container in a direction generally approximating that of the geometric revolution of said volume; means defining a gas-outlet port substantially axially concentric with, and at an axial extremity of, said container; and means defining an annular liquid-outlet port substantially axially concentric with, and at the same axial extremity of said container as, and surrounding, said gas-outlet port.

23. In a neutronic reactor comprising a liquid containing fissionable material adapted to continuously flow as a stream through a container means and to engage in self-sustaining chain fission reaction, with concomitant substantial gas evolution, while maintained in a compact amassment within said container means, improved container-means which comprises: an internally-unobstructed closed container geometrically defining as its interior a spherical volume; means defining a gas-outlet port located at the top of said spherical container and concentric with a substantially vertical axis thereof; means defining an annular liquid-outlet port also at the top of said spherical container, substantially axially concentric with, and surrounding, said means defining a gas-outlet port; means defining a liquid-drain port at the bottom of said spherical container substantially concentric with said vertical axis; and liquid-inlet-duct means communicating substantially tangentially with the interior of said container in a direction generally approximating that of the geometric revolution of said spherical volume about said axis.

24. The improved container means of claim 1 wherein said closed container is adapted to contain aqueous uranyl sulfate solution, as constituting said liquid containing fissionable material, at temperature and pressure of the orders of 250° C. and 1,000 p.s.i.

25. The improved container means of claim 19 wherein said closed container is adapted to contain aqueous uranyl sulfate solution, as constituting said liquid containing fissionable material, at temperature and pressure of the orders of 250° C. and 1,000 p.s.i., and wherein said body of liquid neutron reflectant is deuterium oxide maintained at a pressure of the order of 1,020 p.s.i.

26. The improved container means of claim 1 wherein said closed container is constituted of stainless steel.

27. The improved container means of claim 1 wherein said closed container is constituted of zirconium.

28. The improved container means of claim 1 wherein said means defining a gas-outlet port comprises a broad centrally-apertured nose facing the interior of said container.

29. In a neutronic reactor comprising a liquid containing fissionable material adapted to continuously flow as a stream through a container means and to engage in self-sustaining chain fission reaction, with concomitant substantial gas evolution while maintained in a compact amassment within said core means, improved container means which comprises: an internally-unobstructed closed container geometrically defining as its interior a volume of revolution about a principal axis through said interior; a plurality of liquid-inlet duct means communicating substantially tangentially with the interior of said container in a direction generally approximating that of the geometric revolutions of said volume, means defining at least one gas-outlet port substantially axially concentric with, and at a respective axial extremity of said container; and means defining at least one liquid-outlet port substantially axially concentric with, and at a respecitve axial extremity of, said container, and annularly surrounding any said gas-outlet port also located at the same extremity.

30. In a neutronic reactor comprising a liquid containing fissionable material adapted to continuously flow as a stream through a container means and to engage a self-sustaining chain fission reaction, with concomitant gas evolution, while maintained in a compact amassment within said container means, improved container means which comprises: an internally-unobstructed closed container geometrically defining as its interior a volume of revolution approximating a sphere about a polar principal axis; a liquid-inlet duct means communicating substantially tangentially with the interior of said container in a direction generally approximating that of the geometric revolution of said spherical volume and located at a point of introduction on said spherical geometry within 45° of its equatorial plane; means defining a gas-outlet port substantially axially concentric with, and at an axial extremity of, said container; and means defining an annular liquid-outlet port substantially axially concentric with, at the same axial extremity of said container as, and surrounding, said means defining a gas-outlet port.

31. The improved container means of claim 30 wherein said direction of substantially tangential communication of said liquid-inlet duct is within 30° of perpendicular to the axial plane of its point of introduction upon said spherical volume.

32. The improved container-means of claim 30, wherein said point of introduction of said liquid-inlet duct means upon said spherical volume is substantially 45° from said equatorial plane toward said axial extremity at which said gas-outlet and liquid-outlet ports are located, and wherein said direction of substantially tangential communication is substantially 30 angular degrees from perpendicular to the axial plane of said point of introduction toward said equatorial plane.

33. For improved operation of a neutronic reactor comprising a liquid containing fissionable material adapted to be maintained in a compact amassment, and while so amassed to engage in self-sustaining chain fission reaction with concomitant substantial gas evolution, a method which comprises maintaining said liquid in said compact amassment in rotational flow about a principal axis of the amassment at a sufficient velocity to provide a vortex, by passing said liquid as a continuous stream through said amassment, therein continuously introducing forcefully said stream of liquid tangentially at the periphery of said vortex, continuously discharging evolved gas as it concentrates within the cavity of the vortex together with at least a portion of said stream of liquid axially from said vortex through means defining a gas-outlet port axially registering with an axial extremity of said cavity along with a portion of vortical liquid surrounding the cavity thereby affording a gas-removal operation adapted to automatic self-adjustment to accommodate fluctuations in gas evolution rate while steadily effecting continuous complete removal of all evolved gases without incurring deleterious accumulation thereof within the confines of the amassment, and continuously discharging all remaining portion of said stream axially from an annular region of said vortex surrounding that registering with said means defining a gas-outlet port.

References Cited in the file of this patent

UNITED STATES PATENTS

| 1,569,171 | Brown | Jan. 12, 1926 |
| 2,187,646 | Darrieus | Jan. 16, 1940 |
| 2,556,319 | Davis | June 12, 1951 |
| 2,578,568 | Mayer et al. | Dec. 11, 1951 |
| 2,611,693 | Geyer | Sept. 23, 1952 |
| 2,843,543 | Christy | July 15, 1958 |

OTHER REFERENCES

U.S. Atomic Energy Commission, AECD 3063, "Water Boiler," Sept. 4, 1944, declassified Feb. 21, 1951. The document consists of 32 pages.

U.S. Atomic Energy Commission, AECD 3065, "High Power Water Boiler," Sept. 19, 1945, declassified Feb. 27, 1951. The document consists of 59 pages.

U.S. Atomic Energy Commission, AECD 3059, "An Enriched Homogeneous Nuclear Reactor," Jan. 25, 1951 (date declassified). The document consists of 21 pages.

Los Alamos Scientific Lab. of the Univ. of California, Contract W-7405 Eng. 36 with U.S. Atomic Energy Commission, LA-1337, report written December 1951, report issued March 6, 1952, "Gas Recombination System of the Los Alamos Homogeneous Reactor." The document consists of 27 pages.

UNITED STATES PATENT OFFICE
CERTIFICATE OF CORRECTION

Patent No. 2,945,794                  July 19, 1960

Charles E. Winters et al.

It is hereby certified that error appears in the printed specification of the above numbered patent requiring correction and that the said Letters Patent should read as corrected below.

Column 13, line 40, for "enrich" read -- enriched --; column 15, line 46, for "therewith" read -- therewithin --; columns 29 and 30, Table IV-Continued, second column thereof, line 30, for "80°G" read -- 80°F --.

Signed and sealed this 11th day of April 1961.

(SEAL)
Attest:
ERNEST W. SWIDER
Attesting Officer

ARTHUR W. CROCKER
Acting Commissioner of Patents